US012780410B1

(12) United States Patent
Dao et al.

(10) Patent No.: US 12,780,410 B1
(45) **Date of Patent: *Nov. 3, 2026**

(54) TETHERED DRONE SYSTEMS AND METHODS FOR PROVIDING TELECOMMUNICATION SERVICE

(71) Applicant: Spooky Action, Inc., St. Paul, MN (US)

(72) Inventors: Dan V. Dao, Minneapolis, MN (US); Karl F. Biewald, Minneapolis, MN (US); Evan M. Widloski, Minneapolis, MN (US); Rahul Tiwari, Apple Valley, MN (US)

(73) Assignee: Spooky Action, Inc., St. Paul, MN (US)

(*) Notice: Subject to any disclaimer, the term of this patent is extended or adjusted under 35 U.S.C. 154(b) by 62 days.

This patent is subject to a terminal disclaimer.

(21) Appl. No.: 18/672,714

(22) Filed: May 23, 2024

Related U.S. Application Data

(63) Continuation of application No. 17/121,401, filed on Dec. 14, 2020, now Pat. No. 11,999,476.

(Continued)

(51) Int. Cl.
*B64C 39/00* (2023.01)
*B64C 1/36* (2006.01)
(Continued)

(52) U.S. Cl.
CPC .............. *B64C 39/022* (2013.01); *B64C 1/36* (2013.01); *B64C 39/024* (2013.01); *B64D 27/24* (2013.01);
(Continued)

(58) Field of Classification Search
CPC ....... B64C 39/022; B64C 1/36; B64C 39/024; B64D 27/24; B64F 3/00; H01Q 3/04;
(Continued)

(56) References Cited

U.S. PATENT DOCUMENTS 10,877,477 B1 * 12/2020 Fox .......................... H04R 1/08
11,977,395 B2 * 5/2024 Anderson .............. B64U 70/95
(Continued)

FOREIGN PATENT DOCUMENTS

KR 20200082736 A * 7/2020 ............... B66D 1/38

OTHER PUBLICATIONS

CellSite Solutions, LLC: "Cell on Wheels" 2020 [retrieved on Dec. 14, 2020]. Retrieved from the Internet.
(Continued)

*Primary Examiner* — Ping Y Hsieh
(74) *Attorney, Agent, or Firm* — Neo IP

(57) ABSTRACT

A tethered drone system has a drone that carries telecommunication equipment, such as one or more cellular transceivers and an antenna, that enables the system to provide access to a telecommunication network for a plurality of remote communication devices in a vicinity of the drone. The drone may be disassembled to facilitate transport to a location at which additional cellular service is desired, such as a remote location or an area impacted by a catastrophic weather or geological event. At or near such location, the drone may be quickly assembled and launched. While airborne, the drone may hover for an extended period of time, such as several, hours, days, weeks, or even longer, while the telecommunication equipment carried by the drone provides access to the telecommunication network.

18 Claims, 34 Drawing Sheets

Related U.S. Application Data

(60) Provisional application No. 63/108,236, filed on Oct. 30, 2020.

(51) Int. Cl.

| | |
|---|---|
| ***B64C 39/02*** | (2023.01) |
| ***B64D 27/24*** | (2006.01) |
| ***B64F 3/00*** | (2006.01) |
| ***B64U 30/20*** | (2023.01) |
| ***H01Q 3/04*** | (2006.01) |
| ***H04B 1/38*** | (2015.01) |
| *B64U 10/13* | (2023.01) |
| *B64U 50/19* | (2023.01) |
| *B64U 101/00* | (2023.01) |

(52) U.S. Cl.
CPC ................ *B64F 3/00* (2013.01); *B64U 30/20* (2023.01); *H01Q 3/04* (2013.01); *H04B 1/38* (2013.01); *B64U 10/13* (2023.01); *B64U 50/19* (2023.01); *B64U 2101/00* (2023.01); *B64U 2201/202* (2023.01)

(58) Field of Classification Search
CPC .......... H04B 1/38; B64U 10/13; B64U 30/20; B64U 50/19; B64U 2101/00; B64U 2201/202
See application file for complete search history.

(56) References Cited

U.S. PATENT DOCUMENTS

| | | | | |
|---|---|---|---|---|
| 2015/0259066 | A1* | 9/2015 | Johannesson | B64U 20/50 244/17.27 |
| 2020/0026253 | A1 | 1/2020 | Fuhr et al. | |
| 2020/0086983 | A1* | 3/2020 | Martin | G06F 3/011 |
| 2020/0159209 | A1* | 5/2020 | Montoya-Mejia | G05D 1/0016 |
| 2020/0255128 | A1* | 8/2020 | Suppes | B64U 30/20 |
| 2020/0307407 | A1 | 10/2020 | Fischer | |
| 2020/0385115 | A1 | 12/2020 | Piasecki et al. | |
| 2022/0413113 | A1 | 12/2022 | Fluhler | |

OTHER PUBLICATIONS

Shivamber, Leon: “The Power of a Tethered Drone: What You Need to Know”. Viper Drones Blog/ Dec. 28, 2019 retrieved on Dec. 14, 2020]. Retrieved from the Internet.

* cited by examiner

TETHERED DRONE SYSTEMS AND METHODS FOR PROVIDING TELECOMMUNICATION SERVICE

CROSS REFERENCES TO RELATED APPLICATIONS

This application is related to and claims priority from the following U.S. patents and patent applications. This application is a continuation of U.S. patent application Ser. No. 17/121,401, filed Dec. 14, 2020, which claims priority to U.S. Provisional Application No. 63/108,236, filed Oct. 30, 2020, each of which is incorporated herein by reference in its entirety.

BACKGROUND OF THE INVENTION

Mobile cell sites provide telecommunications infrastructure to regions that lack or have limited cellular network access. For instance, mobile cell sites may be used in rural areas with little or no cellular network access or in regions affected by catastrophic events that reduce or eliminate network access temporarily. Mobile cell sites may also be utilized to supplement organized events that draw large crowds and increase demand for network access, such as concerts or sports events.

Cellular on wheels (COW) systems are designed to be stored on and deployed from a vehicle. However, typical COW systems can be bulky and require large vehicles, limiting their portability and the ability to access locations in rugged terrain. Further, these systems remain expensive and often fail to provide reliable network access over the desirable time period.

The present disclosure is directed to a tethered drone system that carries telecommunication equipment to provide ultraportable, low cost, and reliable mobile cell access. Because the drone is smaller than typical COW systems, it can be stored and launched from smaller vehicles or from designated launch sites unreachable by vehicle. As an example, in some embodiments, the drone can be small and light enough to be carried by a user to a desired launch site. Moreover, design considerations of the drone system, such as overrated motors and improved component cooling, allow the drone to carry its telecommunications payload continuously for long periods of time, such as several weeks or longer.

SUMMARY OF THE INVENTION

In one embodiment, the present invention is directed to a tethered drone system for providing telecommunication services, including a drone coupled to telecommunication equipment for providing access to a telecommunication network for a plurality of remote communication devices in communication range of the telecommunication equipment, the drone having at least one propeller coupled to at least one propeller motor for driving the at least one propeller, and a base system coupled to the drone by a tether, the base system having a controller and a power converter, the controller configured to transmit control data to the drone for controlling an operation of the drone, the power converter configured to transmit a power signal through the tether to the drone for powering electrical components of the drone, including the at least one electrical motor.

In another embodiment, the present invention is directed to a method for providing telecommunication services, including flying a drone at an altitude, wherein the flying comprises driving at least one propeller of the drone with at least one propeller motor to generate thrust, communicating wireless signals between telecommunication equipment coupled to a drone and a plurality of remote communication devices in communication range of the telecommunication equipment, providing the plurality of remote communication devices with access to a telecommunication network via the telecommunication equipment, transmitting electrical power through a tether coupled to the drone, powering electrical components of the drone with the electrical power, including the at least one propeller motor, transmitting control data from a base system to the drone, and controlling an operation of the drone based on the control data.

DETAILED DESCRIPTION

The present disclosure is directed to tethered drone systems and methods. In some embodiments, a tethered drone system has a drone that carries telecommunication equipment, such as one or more cellular transceivers and an antenna, that enables the system to serve as a cellular base station for mobile telephones or other types of cellular devices in a vicinity of the drone. The drone includes overrated motors that increase the flight time available to the drone by reducing component heat generation and friction. Further, the cooling system of the drone body drives air into the telecommunication equipment for cooling, allowing this equipment to be loaded without some components that ordinarily are included as heat sinks. The combined reduction of heat, friction, and weight result in a tethered drone system that is capable of remaining airborne for relatively long periods of time, such as several weeks or longer, while providing cellular network access. The reduced weight and size of the drone further permit the use of relatively small vehicles for drone transport, launching, and landing, providing increased portability in comparison to typical cellular on wheels (COW) systems. Indeed, if desired, the drone may be carried by hand to its desired launch point.

Figure 1:
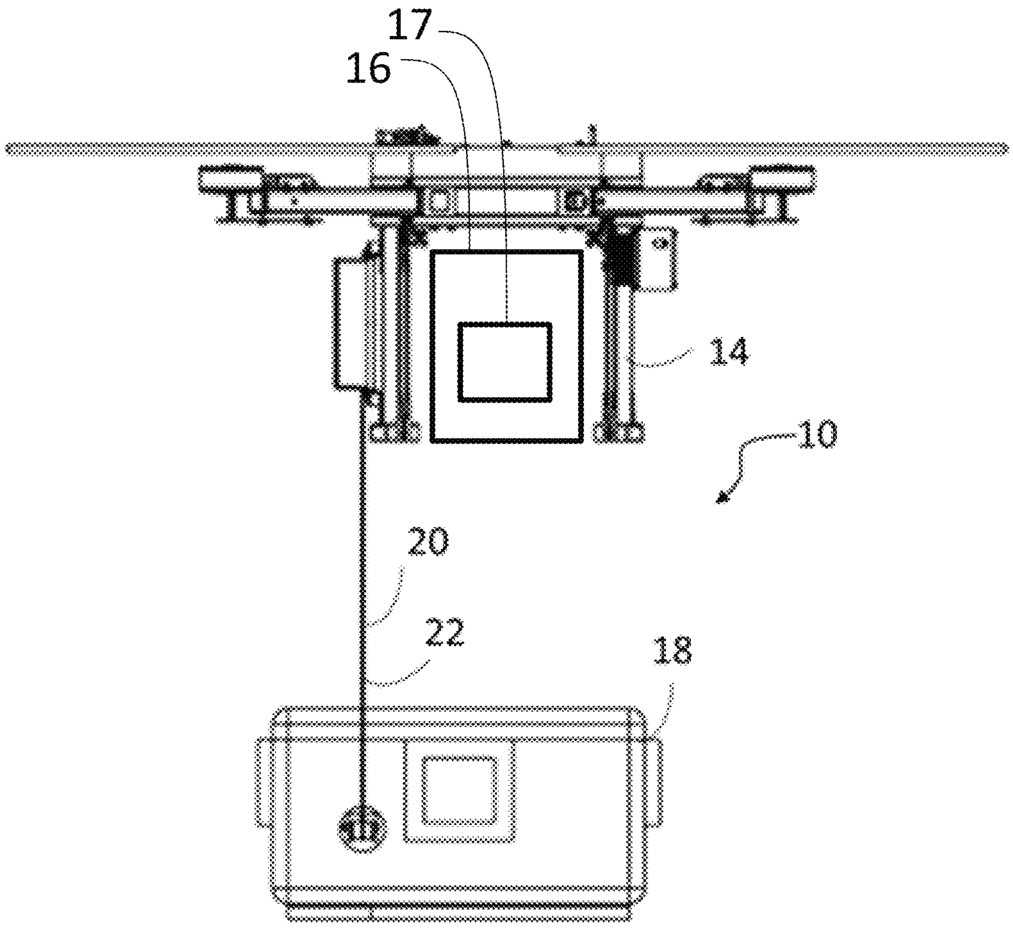
FIG. 1 is a diagram illustrating a perspective view of an embodiment of a tethered drone system in accordance with the present disclosure.

FIG. 1 depicts a tethered drone system 10 in accordance with the present disclosure. This tethered drone system 10 includes a drone 14, a base system 18 for controlling operation of the drone 14, and a tether 20 connecting the drone 14 to the base system 18 and powering the components of the drone 14. The tethered drone system 10 is configured to carry a payload 16 to an aerial location, which may be described using GPS coordinates or other technology. Transport of the tethered drone system 10 may be undertaken using a vehicle, such as an automobile or other motorized vehicle, or the system 10 may be transported using non-motorized means in other instances (e.g., carried by a user or animal). In embodiments where payload 16 comprises telecommunication equipment, the drone system 10 may be used at various locations for which communication services are desired, such as rural areas with little or no cellular network coverage, events that draw larger crowds of cellular network users than would ordinarily be present in the event location, areas impacted by natural disasters or other cellular-interrupting events, and areas of strategic military importance. Locations may be predetermined in some instances, while in other instances locations for tethered drone system 10 may be the result of empirical evaluation of network coverage and strength. In some instances, the tethered drone system 10 remains in one location over a long period of time, such as for several hours, days, weeks or longer, while in other instances the tethered drone system 10 may be relocated one or more times from its initial location as may be desired. Locations include those easily accessible from roadways and those accessible only by traversing terrain, which may be rough terrain. In instances where the transport vehicle is a watercraft, tethered drone system 10 locations include nautical locations.

In embodiments where payload 16 is telecommunication equipment, such as a long-term evolution (LTE) radio or other type of communication equipment used for communication by a cellular base station (also sometimes referred to as a "cell site"), the tethered drone system 10 may function as a mobile or portable cell site. A cellular base station generally operates by transmitting and receiving RF signals to and from cell phones. Thus, a cell phone of a user placing a call converts voice to data, which is transmitted as an RF signal by the cell phone's antenna and is received by telecommunications payload of the drone 14. Then, the data is communicated to the base system 10, such as through an optical cable 22 running within tether 20. In some embodiments, the data is transmitted using wireless (e.g., Wi-Fi) downlinks rather than the tether 20. The base system 18 may be interfaced with a network access point of a cellular network or other type of network that routes the data to the call's destination. Data from the call's destination may be communicated in the opposite direction through the telecommunication equipment of the drone 14 to the cell phone.

Figure 2:
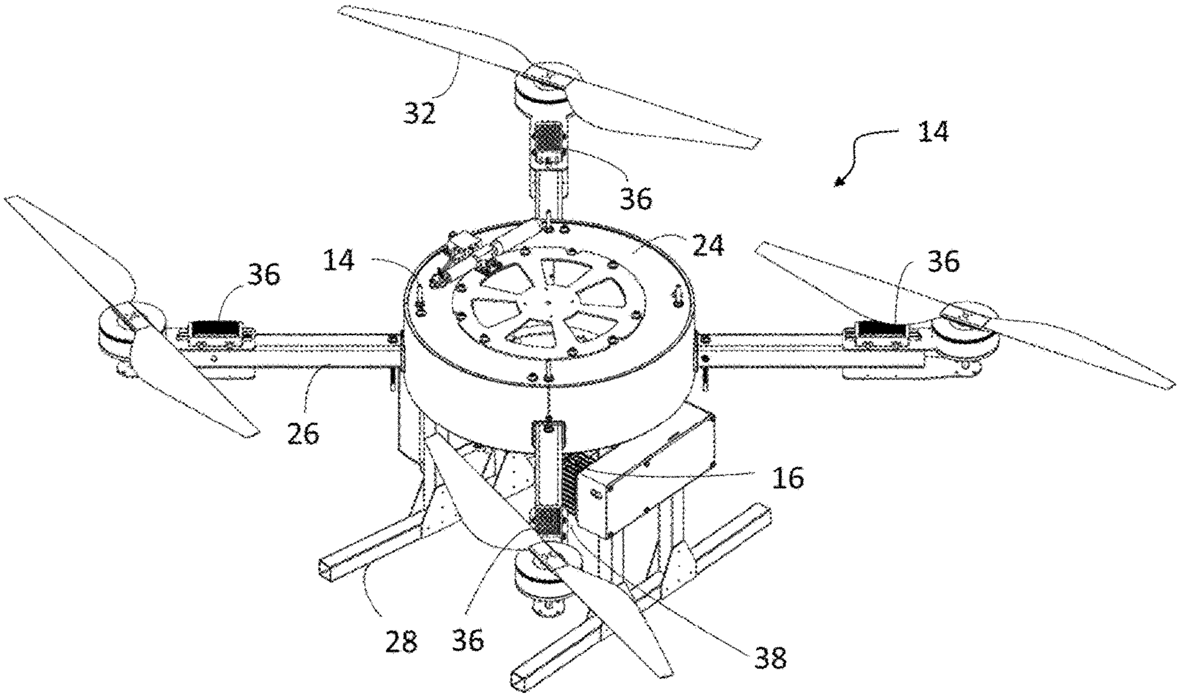
FIG. 2 is a diagram illustrating a perspective view of a tethered drone, such as is illustrated by FIG. 1, with propellers stationary.

FIG. 2 depicts an exemplary embodiment of the drone 14 without payload 16 attached for illustrative purposes. The drone 14 has a drone body 24, arms 26, and landing gear 28. Each arm 26 is coupled to and extends from the drone body 24, and each arm 26 is also coupled to a respective propeller 32 that provides an upward thrust for counteracting the weight of the drone 14. Each propeller 32 is coupled to and driven by a respective motor 36 that is mounted on the same arm 26. The propellers 32 and the propeller motors 36 for driving the propellers 32 shall be collectively referred to hereafter as the drone's "thrust system." Note that, although not shown in FIG. 2, the payload 16 (FIG. 1) may be mounted to and held by the drone 14 in payload bay 38 on the underside of the drone body 24, and the thrust system generates sufficient upward thrust to counteract the weights of the drone 14 and its payload 16 so that the drone 14 hovers or otherwise flies at a desired altitude.

In some embodiments, the payload 16 may be up to about 10 kg, though other weights of the payload 16 are possible in other embodiments. In addition, for some embodiments, the combined weight of the drone 14 and the payload 16 is limited to much less than the total capacity provided by the thrust system so that the propeller motors 36 are significantly overrated relative to the weight being carried. In this regard, running a motor, such as a propeller motor 36 for driving a propeller 32, close to its overall capacity tends to generate a significant amount of heat, strain, and friction that over time can cause the motor to fail. By significantly reducing the thrust generated by the motor, the motor will generate significantly less heat, strain, and friction, thereby extending the operational life of the motor.

As an example, while many conventional drones are designed such that their propeller motors run at close to their maximum thrust capacity (e.g., close to approximately 90% thrust capacity), the present disclosure uses propeller motors 36 that run at less than 50% thrust capacity. In some embodiments, the propeller motors 36 run at less than 20% thrust capacity, such as around 10% thrust capacity or so while hovering. Thus, the drone 14 has propeller motors 36 that are significantly overrated relative to the weight of the payload 16 and drone 14 being carried, and using propeller motors 36 that are overrated by such a significant extent enables the motors 36 to operate at significantly reduced heat, strain, and friction, thereby increasing the operational life of the motors. In some embodiments, the weight of the drone 14 and payload 16 is around 30 pounds whereas the thrust system is capable of generating an upward thrust of about 160 pounds such that less than 20% thrust capacity is needed for the drone 14 to hover. In such an embodiment, the drone 14 is capable of hovering or otherwise flying continuously for an extended time, such as several weeks or more.

Figure 3:
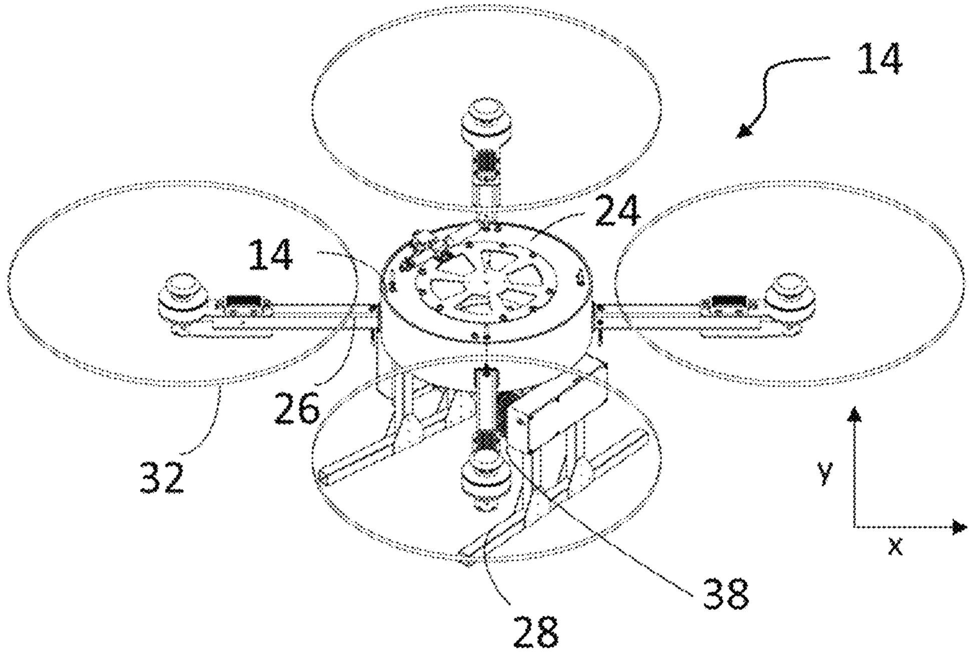
FIG. 3 is a diagram illustrating a perspective view of a tethered drone, such as is illustrated by FIG. 1, with propellers in motion.

While four propellers 32 (each with one propeller motor 36) are depicted, different numbers of propellers 32 and motors 36 are possible. Similarly, while four arms 26 are depicted, different numbers of arms 26 are possible, with exemplary arm features and attachment being detailed below. The drone 14 is shown as stationary, with propellers 32 not in motion in FIG. 2. In contrast, FIG. 3 depicts the drone 14 in motion, with propellers 32 rotating. Further detail of individual components of the drone 14 is described below.

Figure 4:
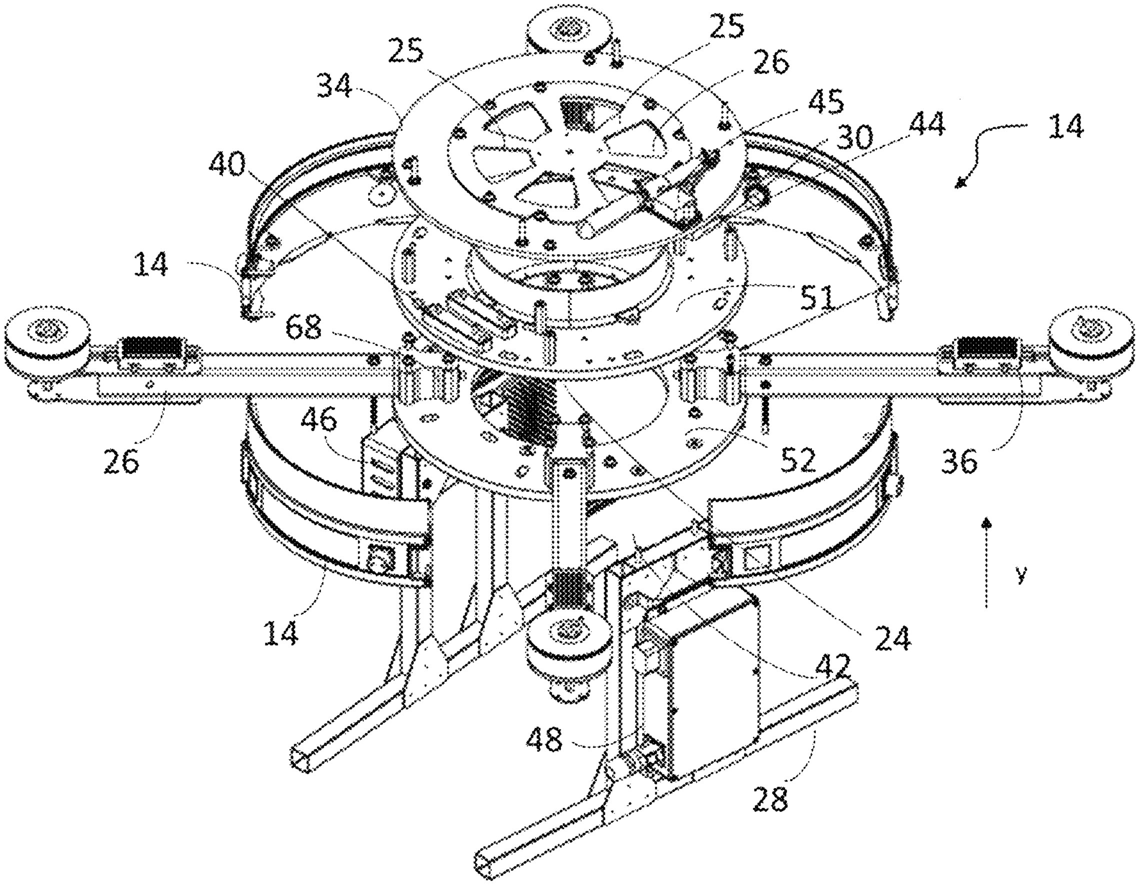
FIG. 4 is a diagram illustrating an exploded perspective view of a tethered drone, such as is illustrated by FIG. 1.

FIG. 4 shows an exploded view of the drone 14 with some components removed for simplicity of illustration. Notably, drone body 24 includes a fan 34 for the cooling of payload 16 and drone components. The fan 34 has a plurality of blades 25 that are separated by spaces 26. During operation, the fan 34 rotates, thereby rotating the blades 25 which force air through the spaces 26. Specifically, air is drawn by the fan 34 from above the drone body 24 down through the spaces 26 and a hollow interior of the drone body 24 to the payload 16. Such air passes over the payload 16 drawing heat away from the payload 16 and thus helps to cool the payload 16 as the air flows. The fan 34 shown by FIG. 4 is exemplary and other types of fans may be used in other embodiments.

By using the fan 34 to cool the payload 16, at least some heat sinks that otherwise would be necessary for the payload 16 may be eliminated or reduced in size such that the overall weight and size of the payload 16 may be reduced due to the presence and operation of the fan 24. Noting that heat sinking components for conventional telecommunication equipment are often bulky and heavy, utilization of the fan 34 helps to eliminate or reduce the effects of many problems associated with telecommunication equipment as payload and also helps to extend the duration at which the drone 14 may continuously hover or otherwise fly. The fan 34 is depicted in a central location within drone body 24 and oriented such that air is moved toward payload bay 38. In embodiments not depicted, the location of fan 34 may be in other regions of drone body 24 and draw in air from other directions. However, by forcing air in a downward direction, the momentum of the airflow generates a force on the drone 14 that helps to counteract weight, thereby helping the drone 14 operate more efficiently such that the propellers 32 need to produce less thrust to generate a desired amount of lift.

Also shown in FIG. 4 are various propulsion components of the drone 14, including propeller motors 36 located on an outward end of each arm 26. Each propeller motor 36 drives the rotation of each propeller 32, generating thrust that propels drone 14 upward. Propellers 32 are shown to be electrically driven, though other types of propulsion, such as gas-driven propulsion, are possible in other embodiments. While the propellers 32 are positioned in one orientation to generate upward (in the y-direction) thrust in FIG. 3, propellers 32 may oriented in different directions to direct or control drone 14 differently (e.g., with both horizontal and vertical components in the x-direction and y-direction, respectively) in other embodiments.

Various configurations of the drone body 24 are possible. In the exemplary embodiment depicted by FIG. 3, the drone body 24 is circular and forms a hollow cylinder, where a hollow region at its center permits air to flow from the fan 34 through the drone body 24 to the payload 16. In other embodiments, other shapes and configurations of the drone body 24 are possible. In the embodiment shown by FIG. 4, the drone body 26 comprises an upper plate 51, referred to hereafter as "drone upper plate," and a lower plate 52, referred to hereafter as "drone lower plate." Each plate 51, 52 is circular with a hollow region at its center, but other shapes of the plates 51, 52 are possible in other embodiments.

Note that various components may be mounted on the plates 51, 52. As an example, in the embodiment depicted by FIG. 4, the fan 34 is mounted on the drone upper plater 51. In addition, sockets 68 for receiving and mating with the arms 26 are mounted between the plates 51, 52. In this regard, each socket 68 may be coupled to each plate 51, 52 and reside in a hollow region formed by separation of the plates 51, 52.

During operation, the drone 14 may be transported to its airborne position by propellers 32 and maintained in that position while providing cellular network access. As such, differential thrusting of propellers 32 may be used to control roll, pitch, and yaw so that the drone 14 maintains stable flight and is directed to a desired location, as known in the art. As noted above, the propeller motors 36 may be overrated so that they reduce the friction and heat in bearings and other components.

Also depicted in FIG. 4 are a flight controller 30, a drone controller 40, a data interface 42, a drone power converter 48, a parachute launcher 45, and a battery 46. These components are described in detail below. The locations of these components depicted by FIG. 4 are exemplary and other locations are possible in other embodiments.

Figure 5:
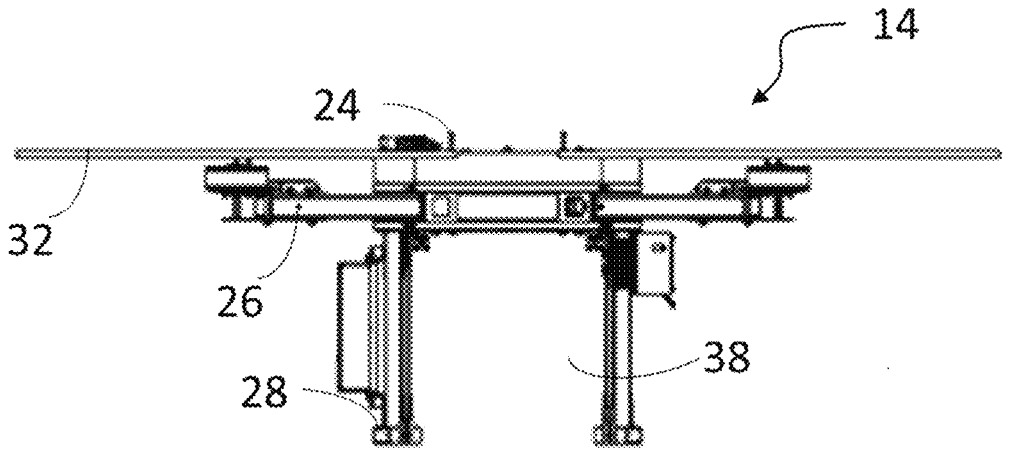
FIG. 5 is a diagram illustrating a side elevational view of a tethered drone, such as is illustrated by FIG. 1, without payload.
Figure 6:
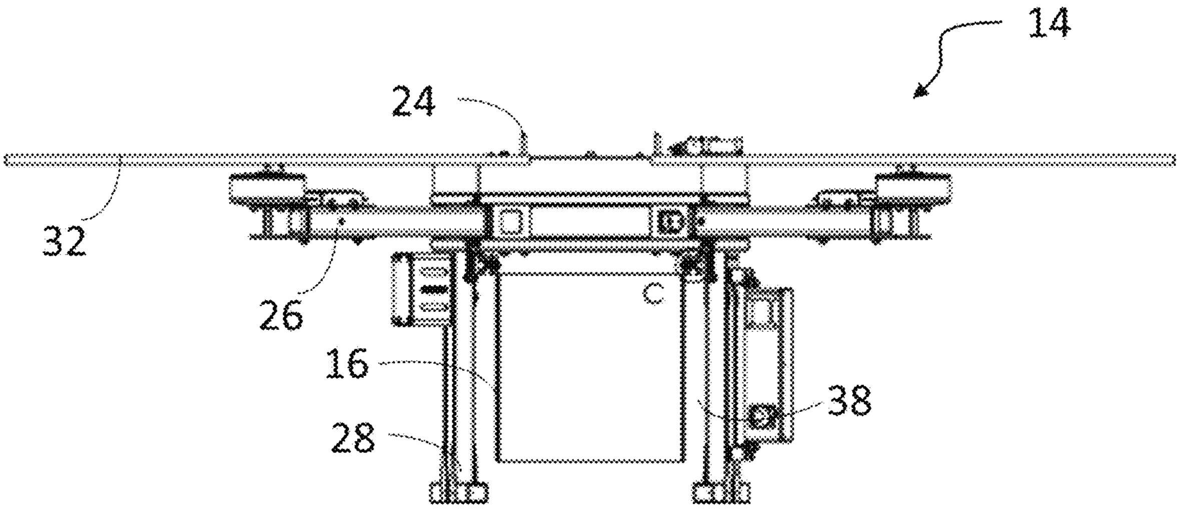
FIG. 6 is a diagram illustrating a side elevational view of a tethered drone, such as is illustrated by FIG. 1, with payload mounted.
Figure 7:
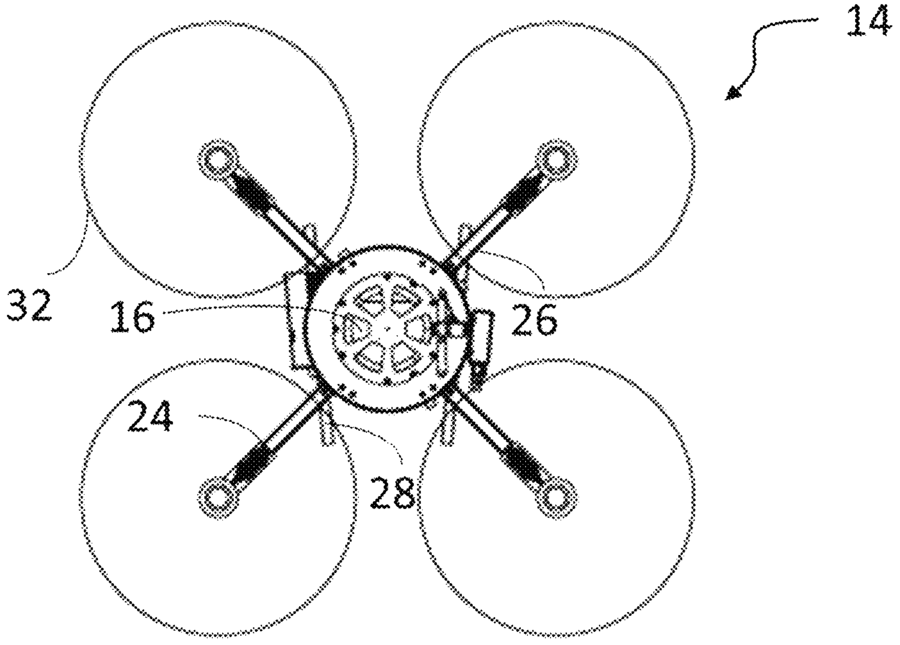
FIG. 7 is a diagram illustrating a top elevational view of a tethered drone, such as is illustrated by FIG. 1, with payload mounted.
Figure 8:
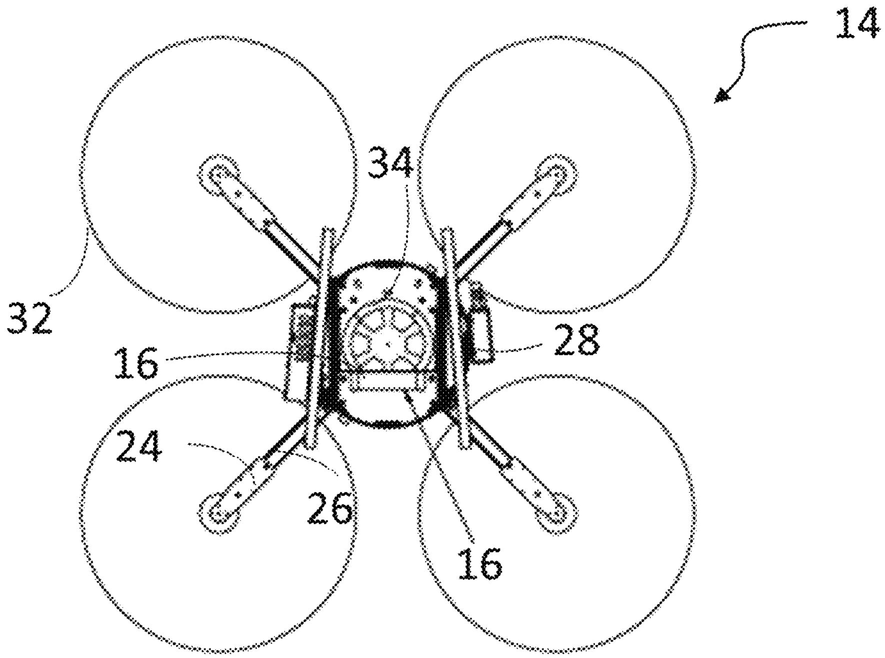
FIG. 8 is a diagram illustrating a bottom elevational view of a tethered drone, such as is illustrated by FIG. 1, with payload mounted.

FIG. 5 depicts the drone 14 without payload 16, which would be held within the payload bay 38 when mounted on the drone 14. The payload bay 38 is shown between two sets of landing gear 28 and below the drone body 24. FIG. 6 shows the drone 14 with payload 16 attached to the drone 14 and held within payload bay 38. Similarly, payload 16 is visible from a top view in FIG. 7 (through the spaces 26 (FIG. 4) in the fan 34) and from a bottom view in FIG. 8.

Figure 9:
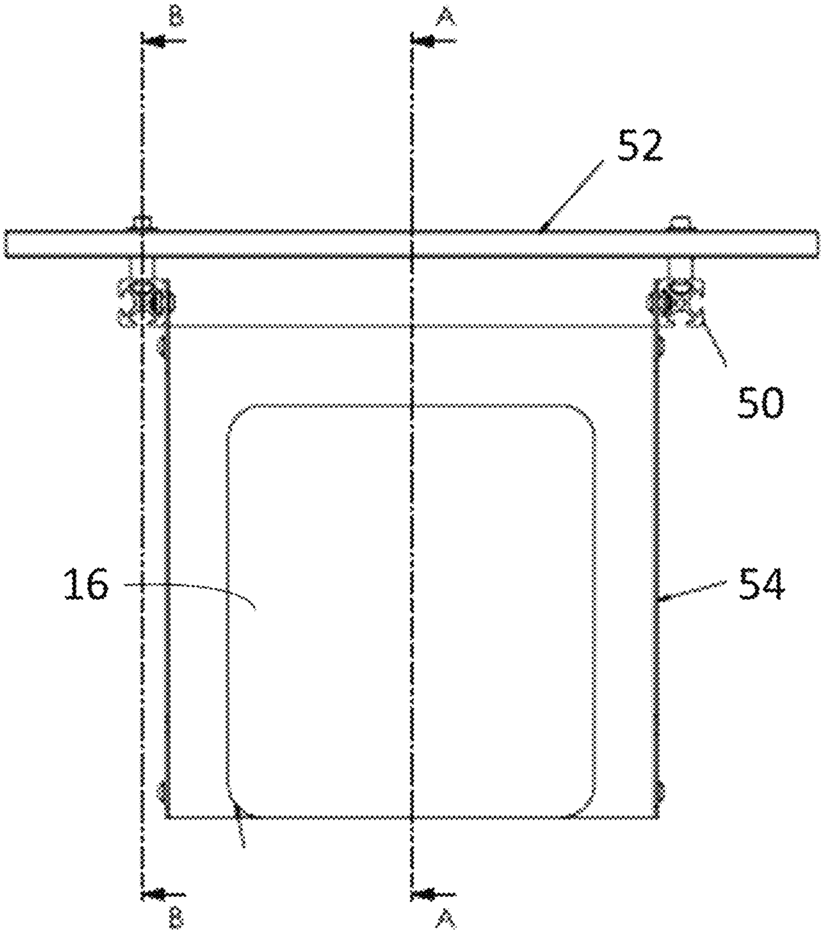
FIG. 9 is a diagram illustrating a side elevational view of a payload bay of a tethered drone, such as is illustrated by FIG. 1, with payload mounted.

FIG. 9 depicts a mounting system that may be used to mount payload 16 onto the drone 14. In FIG. 9, the payload 16 is attached to a pair of mounting rails 50 coupled to the drone bottom plate 52, such that the payload 16 is positioned within the payload bay 38. In other embodiments, the drone 14 may have any number (e.g., one or more) mounting rails 50 to which the payload 16 is attached.

Figure 10:
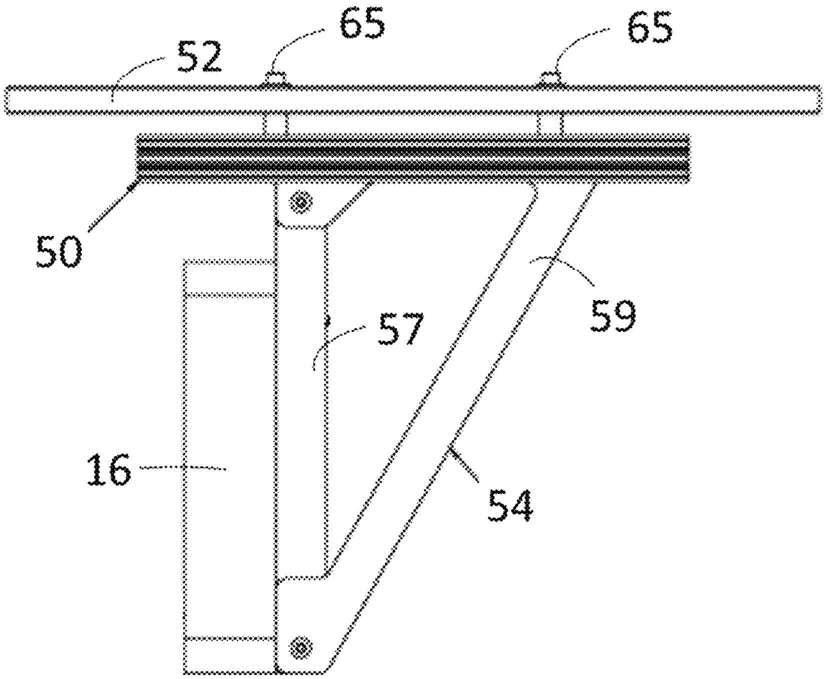
FIG. 10 is a diagram illustrating a side elevational view of a mounting bracket of a tethered drone, such as is illustrated by FIG. 1, with payload mounted.

As shown by FIGS. 9 and 10, the payload 16 is attached to a pair of mounting brackets 54 that are respectively coupled to each mounting rail 50. The mounting bracket 54 is shaped to attach to payload 16 and its respective mounting rail 50, though shapes different from those shown in FIG. 10 are possible. As shown by FIG. 10, each mounting bracket 54 has a vertical arm 57 and an angled arm 59. The payload 16 is attached to the vertical arm 57, and each end of the vertical arm 57 is coupled to a respective end of the angled arm 59. In addition, the angled arm 59 is coupled to a respective mounting rail 50 by one or more couplers, as will be described in more detail below. In some embodiments, the mounting bracket 54 is composed of aluminum, but other materials are possible in other embodiments. Attachment of the payload 16 to a mounting bracket 54 may be through any known coupling arrangement, such as one or more screws, bolts, clips, or tabs and slots.

Referring again to FIG. 9, the drone bottom plate 52 is located on the underside of drone body 24, with landing gear 28 also extending from drone bottom plate 52 and defining the space for payload bay 38. Each mounting rail 50 is mounted on the drone bottom plate 52 or other component of the drone 14 through any known coupling arrangement, such as one or more screws, bolts, clips, or tabs and slots, or by welding or other techniques for attaching the mounting rail 50 to the plate 52. In other embodiments, the mounting rail 50 may be of unitary construction with the drone bottom plate 52 or other component of the drone 14. In the embodiment depicted by FIGS. 10-13, each mounting bracket 52 is attached to the plate 52 by a plurality of couplers 65, such as bolts, that pass through and extend from the plate 52. In some embodiments, each mounting rail 50 is composed of aluminum but other materials are possible in other embodiments.

Various configurations and shapes of the mounting rails 50 are possible. In the exemplary embodiment depicted by FIGS. 10-13, the depicted mounting rail 50 is slotted, thereby having at least one slot 61 for receiving at least one coupler 53 for coupling a mounting bracket 54 to the rail 50. As an example, such a coupler 53 may comprise a mounting nut 56 and screw 58 where the screw 58 passes through an end of an arm 57, 59 of the mounting bracket 54, and the nut 56 is screwed or otherwise attached to the screw 58 and inserted into a slot of the mounting rail 50 in order to secure the arm 57, 59 to the rail 50, as will be described in more detail below.

Figure 11:
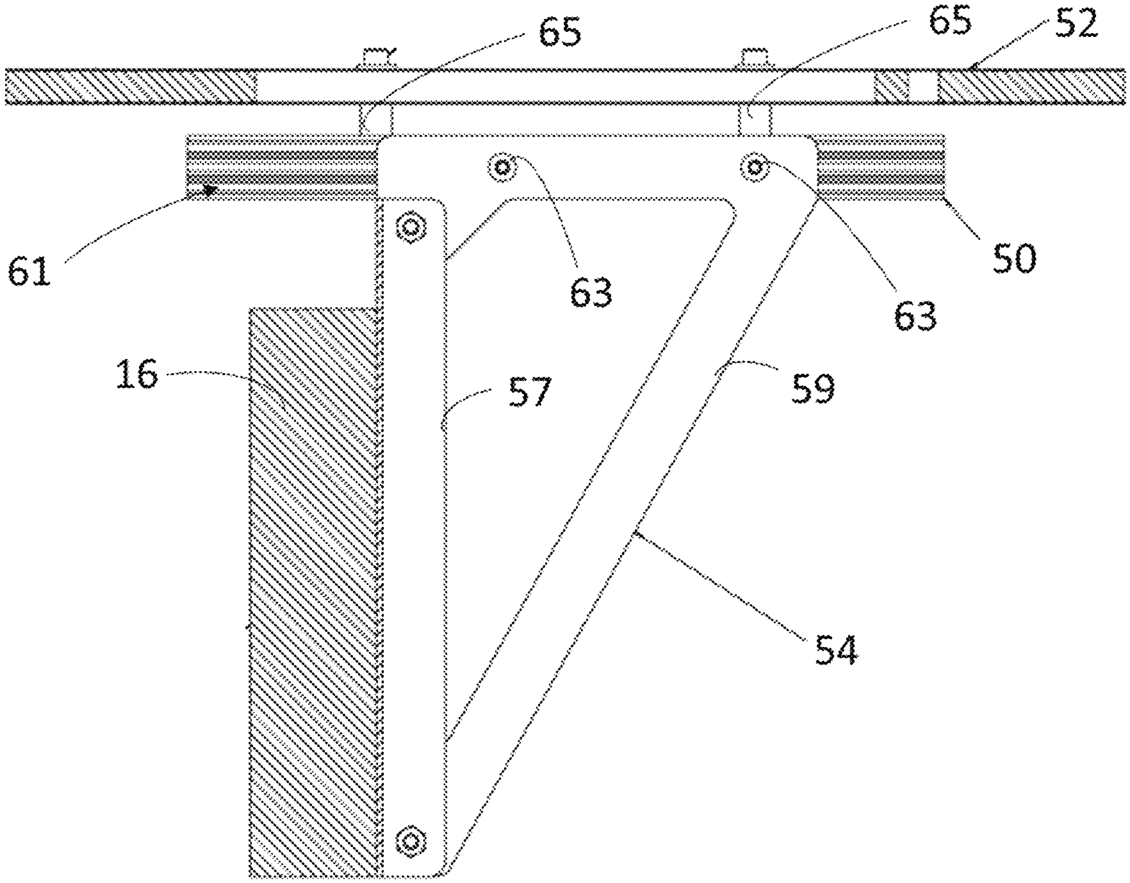
FIG. 11 is a diagram illustrating a sectional view along line A-A of FIG. 9 with an interior perspective of the payload bay.
Figure 12:
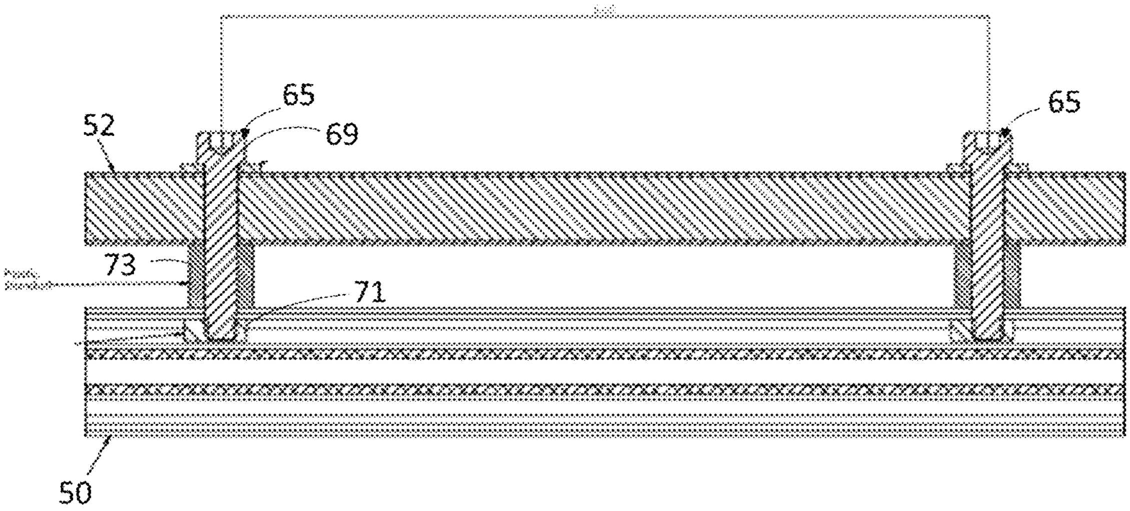
FIG. 12 is a diagram illustrating a sectional view along line B-B of FIG. 9 depicting a mounting bracket.

FIG. 11 shows an interior perspective view of a mounting bracket 54 attached to a mounting rail 50 from the sectional view along line A-A of FIG. 9. Further, FIG. 12 depicts a sectional view of mounting rail 50 taken along line B-B of FIG. 9. The mounting rail 50 is shown to be slotted having a slot 61 extending along an entire length of the rail 50 for receiving mounting nuts 56 that can be slid into the slot 61 in order to secure a mounting bracket 54 to the rail 50, as described in more detail below.

Figure 13:
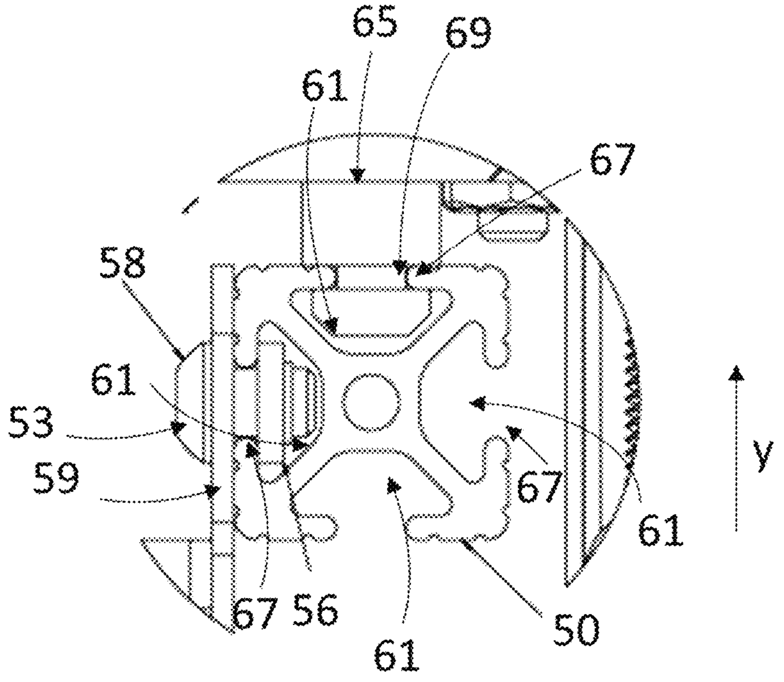
FIG. 13 is a diagram illustrating a detail elevational view of the mounting bracket depicted by FIG. 11 connected to a mounting rail.

FIG. 13 shows an end of the mounting rail 50 when a mounting bracket 54 is secured to the rail 50. As shown by FIG. 13, the mounting rail 50 has a rectangular or square shape, though other shapes of the rail 50 are possible in other embodiments. Further, a slot 61 is formed in each side of the rail 50. Each slot 61 forms an elongated cavity within the rail 50, and each slot has a mouth 67 where a width of the mouth 67 is smaller than a width of the cavity such a mounting nut 56 may fit into the slot 61 but is too large to exit the slot 61 through the mouth 67. In the embodiment depicted by FIG. 13, the rail 50 may be a conventional 80/20 T-slot framing extrusion composed of aluminum or some other material, but other types and shapes of the rail 50 in other embodiments are possible.

To attach a mounting bracket 54 to the mounting rail 50, the mounting bracket 54 may be equipped with a pair of couplers 53 that are engaged with the rail 50 as described herein. In this regard, as described above, each coupler 53 may comprise a mounting screw 58 and mounting nut 56 arrangement, and the screw 53 may be inserted through a respective hole in the angled arm 59 of the bracket 54 where the head of the screw 58 is too large to fit through the hole. Further, the mounting nut 56 may be positioned (e.g., screwed) on the screw 58 such that a space exists between the nut 56 and the angled arm 59 so that a wall of the rail 50 forming a slot 61 may fit between the nut 56 and the arm 59, as shown by FIG. 13. Then, the nut 56 may be inserted into the slot 61 at an end of the rail 50 and slid along the slot 61 until it is at a desired position. In this regard, after inserting the nut 56 into the slot 61, a user may push the mounting bracket 54 by hand such that the nut 56 slides through the slot 61 and the screw 58 slides through the mouth 67. Once, the bracket 54 is at the desired position relative to the rail 50, the nut 56 can be tightened to secure the nut 56 in place such that relative movement between the coupler 53 and the rail 50 is prevented.

Figure 14:
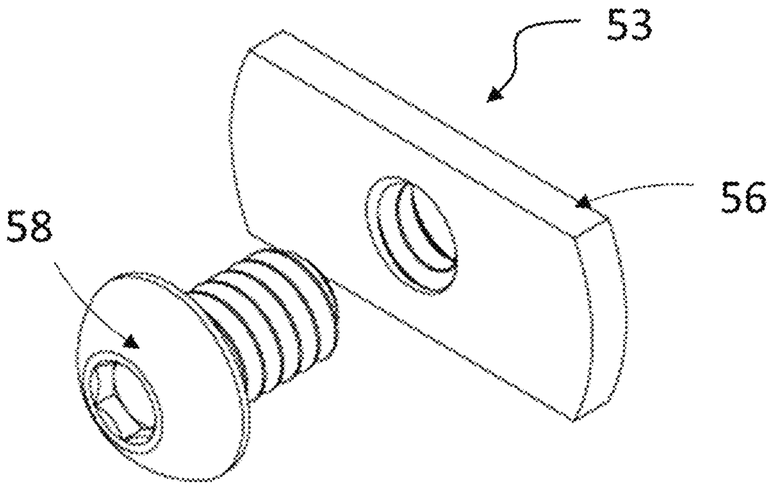
FIG. 14 is a diagram illustrating a perspective view of a coupler that may be used to connect the mounting bracket to the mounting rail.

In this regard, the nut 56 may be elongated, as shown by FIG. 14, along the longitudinal axis of the rail 50 such that rotation of the nut 56 within the slot 61 is prevented by the walls of the slot 61. Thus, rotating the screw 58 once the nut 56 is within the slot 61 tightens the nut 56 against the wall of the rail 50 that is between the nut 56 and the angled arm 59. That is, rotating the screw 58 causes the screw 58 to rotate relative to the nut 56 since rotation of the nut 56 is prevented by the rail 50, thereby causing the nut 56 to tighten against the wall of the slot 61 (and the screw 58 against the arm 59) as the screw 58 is screwed into the nut 56. This tightening increases frictional forces, which prevent the nut 56 from sliding relative to the rail 50. Note that both couplers 53 of the same bracket 54 may be inserted into the same slot 61 and secured to the rail 50 in the manner described above.

When removal of the bracket 54 from the rail 50 is desired, the screw 58 can be rotated in the opposite direction to loosen the nut 56 such that the nut 56 may slide along the length of the rail 50 and out of the slot 61 at the end of the rail 50. In other embodiments, other techniques and configurations for securing the mounting bracket 54 to the mounting rail 50 are possible. The use of a slotted rail 50, such as an 80/20 framing extrusion, helps to facilitate attachment and removal of mounting brackets 54 so that different payloads can be quickly and easily exchanged as may be desired. Further, 80/20 T-slot framing extrusions are widely used in a variety of conventional applications and are readily available at a relatively low cost.

Similar techniques may be used to engage a mounting rail 50 with couplers 65 extending from the drone bottom plate 52 in order to mount the mounting rail 50 on the drone body 24. In this regard, each coupler 65 may have a screw 69 and nut 71 arrangement, similar to the couplers 53 described above. The coupler 65 may also have a sheath 73 through which the screw 69 extends. The rail 50 may be moved relative to the coupler 65 such that the nut 71 is inserted into a slot 61 at the end of the rail 50, similar to the nut 56 described above. Further, the nut 71 may be positioned (e.g., screwed) on the screw 69 such that a space exists between the nut 71 and the sheath 73 so that a wall of the rail 50 forming a slot 61 may fit between the nut 71 and the arm 73, as shown by FIG. 13. Once inserted into the slot 61, the nut 71 may be slid along the slot 61 until it is at a desired position. The nut 71 can then be tightened to secure the nut 71 in place such that relative movement between the coupler 65 and the rail 50 is prevented using the techniques described above for tightening the nut 56. That is, the screw 69 can be rotated while the walls of the slot 61 prevent the nut 71 from rotating, as described for the nut 56.

Figure 15:
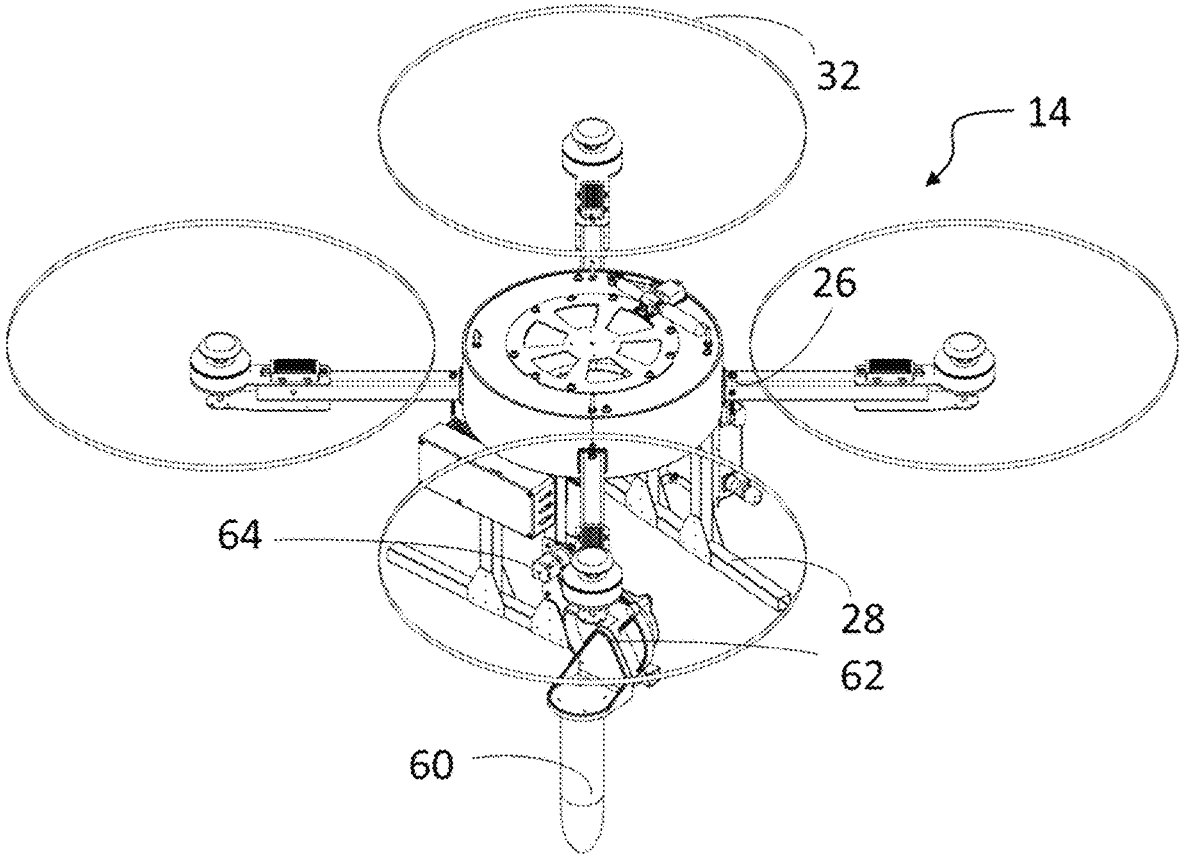
FIG. 15 is a diagram illustrating a perspective view of an antenna of a tethered drone, such as is illustrated by FIG. 1, with the antenna in an extended position.

In some embodiments, the tethered drone system 10 includes an antenna 60 (FIG. 15) that rotates from a stowed position to an extended position. The antenna 60 may be used to transmit and receive RF signals in the case where payload 16 is telecommunication equipment. As an example, when the payload 16 functions as at least a portion of a cellular base station, the antenna 60 may be used for communication with mobile cellular device (e.g., smartphones) within a vicinity of the drone 14, such as the transmission and receptions of signals for cellular telephone calls.

Figure 16:
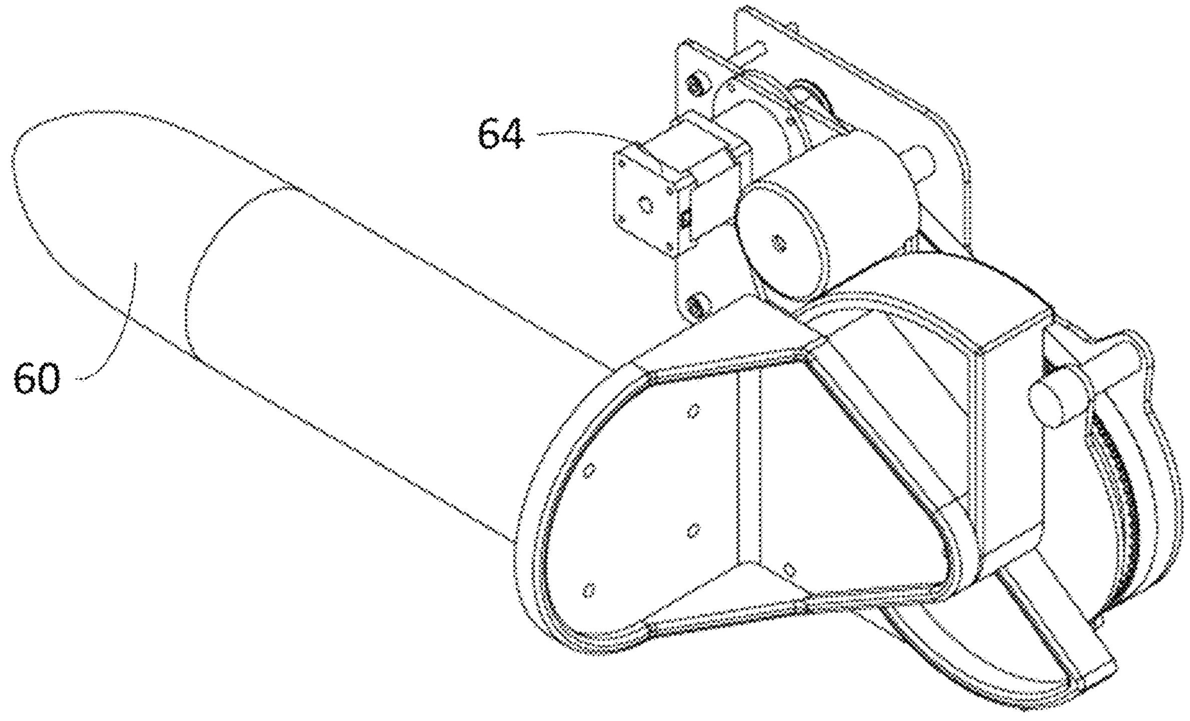
FIG. 16 is a diagram illustrating a perspective view of the antenna of FIG. 15 in a stowed position.
Figure 17:
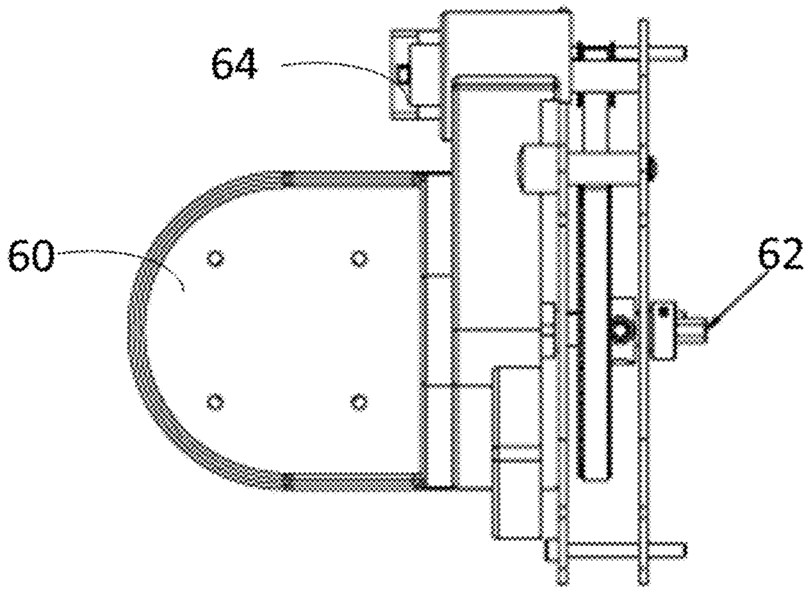
FIG. 17 is a diagram illustrating a side elevational view of the antenna of FIG. 16.

FIGS. 16 and 17 show the antenna 60 in the stowed position. As shown by FIG. 16, the antenna 60 is elongated having a longitudinal axis that is parallel to horizontal (the x-direction). The antenna 60 may be placed in the stowed position during takeoffs and landings, or at other times as may be desired (e.g., during transport to or from a location where the drone 14 is launched), to help protect the antenna 60 from damage. In this regard, in the stowed position, the tip of the antenna 60 is raised further from the ground and brought closer to the drone body 24 reducing the likelihood that the antenna 60 will strike an object that could damage the antenna 60. When the antenna 60 is in the stowed position, the overall footprint of the drone 14 is also decreased.

However, the stowed position may not be ideal for communication. In this regard, in the stowed position, the antenna 60 may be positioned such that the drone body 24 or another portion of the drone 14 is between the antenna 60 and remote communication devices (e.g., cellular telephones) with which the antenna 60 is to communicate, and such drone body 24 or other portion of the drone 14 may attenuate or otherwise adversely affect signals passing through it. Nevertheless, in some embodiments, it is possible for the antenna 60 to be fully functional and used for communication while in the stowed position.

Figure 18:
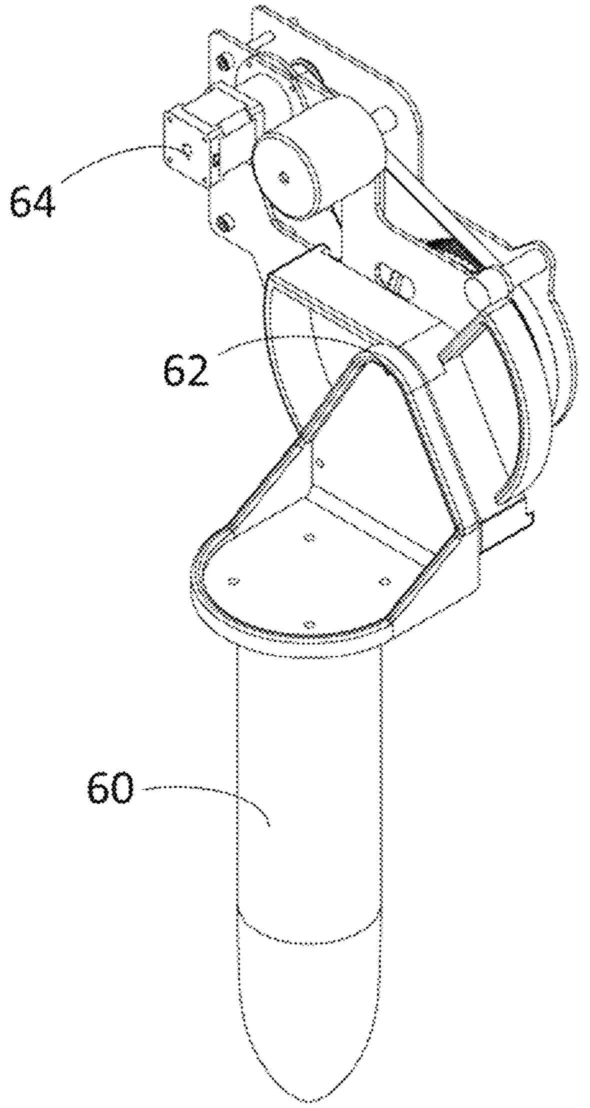
FIG. 18 is a diagram illustrating a perspective view of an antenna of a tethered drone, such as is illustrated by FIG. 15, with the antenna in an extended position.

To improve the communication performance of the antenna 60, the antenna 60 may be swiveled about a pivot 62 to reach an extended position, as shown by FIG. 18. That is, the antenna 60 may be rotated about 90 degrees downward (toward the ground) so that the longitudinal axis of the antenna 60 is parallel to the y-axis. In this position, the antenna 60 is below the drone 14 such that the drone body 24 and other portions of the drone 14 are not between the antenna 60 and mobile communication devices on the ground. Thus, when the drone 14 is hovering at a high altitude, such as several hundred feet above ground, the antenna 60 should be able to communicate with a mobile communication on the ground in any direction (i.e., 360 degree coverage) without the drone body 24 or other portions of the drone 14 significantly attenuating or otherwise interfering with the communicated signals.

As shown by FIG. 17, the antenna 60 may be coupled to a motor 64, referred to hereafter as "antenna motor," that is configured to rotate the antenna 60 about a pivot 62 (e.g., an axle). When desired, a user may signal for the antenna 60 to be repositioned into a desired position. As an example, in some cases, the antenna 60 may be in the stowed position when drone 14 is launched, swiveled into the extended position once drone 14 is airborne, and returned to the stowed position before drone 14 lands. In some cases, the antenna 60 may be automatically repositioned. As an example, the drone 14 may include an altimeter for sensing altitude, and the antenna 60 may be automatically moved from the stowed position to the extended position when the drone 14 reaches a predefined altitude or when other predefined event is detected. Conversely, the antenna 60 may be automatically moved from the extended position to the stored position when the drone 14 moves below a predefined altitude or other predefined event is detected (e.g., a command to land is received).

As shown in FIGS. 1 through 8, the drone 14 includes several arms 26, which extend from the drone body 24 radially, and a propeller 32 is mounted at the end of each arm 26 away from the drone body 24. In some embodiments, each of the arms 26 is elongated and extends from drone the body 24 horizontally. That is, the longitudinal axis of each arm 26 is parallel with the x-direction, though other angles of the arms 26 when connected to the drone body 24 are possible. As will be described in more detail below, the arms 26 are removable from drone body 24 to facilitate transport of the drone 14 to and from launch points or other locations, such as storage sites.

Figure 19:
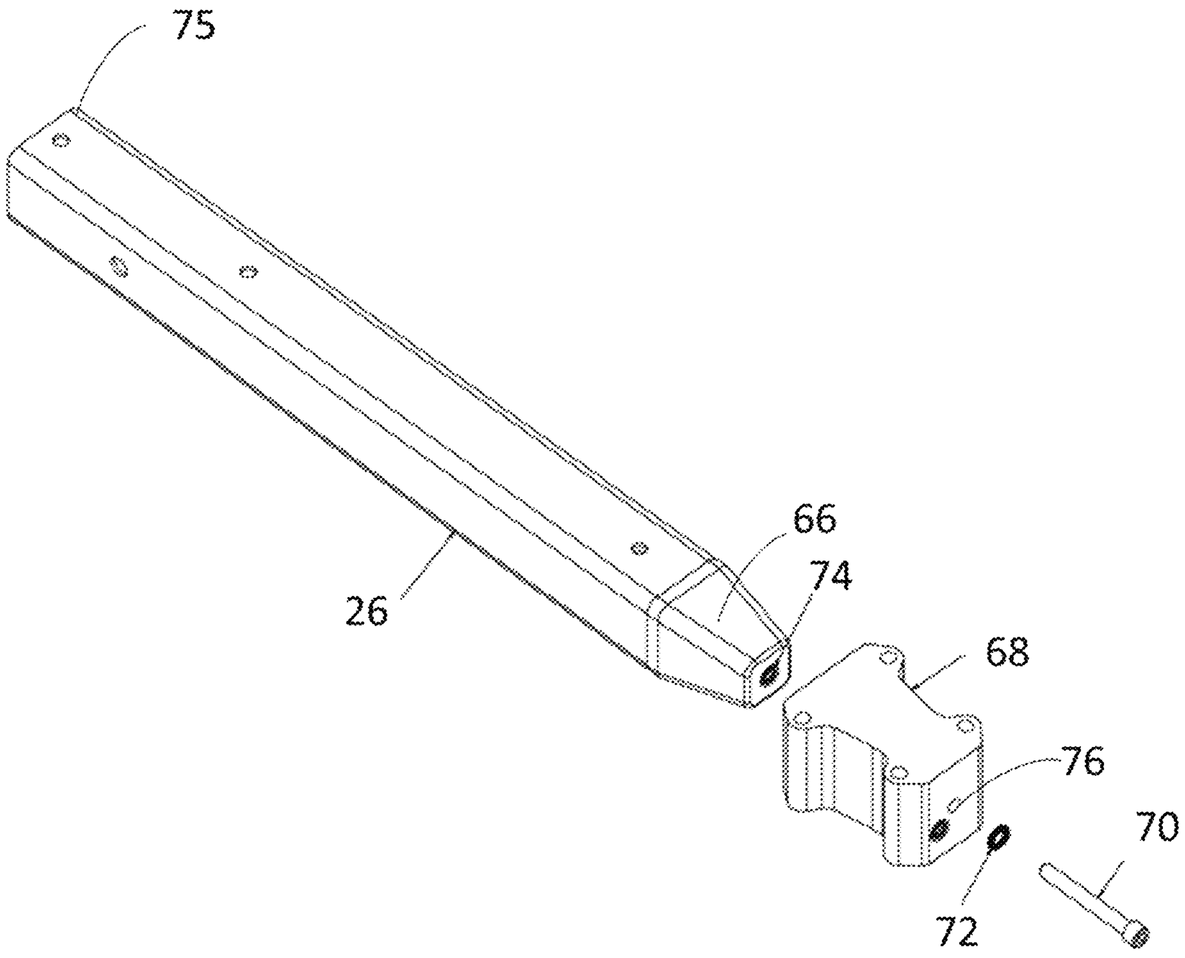
FIG. 19 is a diagram illustrating an exploded perspective view of one embodiment of an arm of a tethered drone, such as is illustrated by FIG. 1.

FIG. 19 depicts an exploded view of an arm 26 and a mounting socket 68 that may be used to connect the arm 26 to the drone body 24. The socket 68 may be mounted on the drone bottom plate 52 of the drone body 24, as shown by FIG. 4. As shown by FIG. 19, the arm 26 has a tapered end 66 opposite the end 75 on which a propeller 32 is mounted. In some embodiments, the taper is a Morse taper, though other types of tapers may be used in other embodiments. The tapered end 66 is dimensioned to fit snugly within a tapered cavity of the mounting socket 68, such that the arm 26 is at least partially retained within the socket 68 by friction fitting when inserted.

The tapered end 66 further includes a hole 74, and the wall defining the hole 74 may be threaded for receiving a threaded coupler, such as a screw 70. As shown in FIG. 19, the hole 74 is positioned on the tapered end 66 coaxially with the longitudinal axis of the arm 26. However, in other embodiments, the location of the hole 74 may be in another location. Similarly, the socket 68 also has a hole 76 that is aligned with the hole 74 of the arm 26 when the arm 26 is inserted into the socket 68. If desired, the wall defining the hole 76 may also be threaded.

Figure 20:
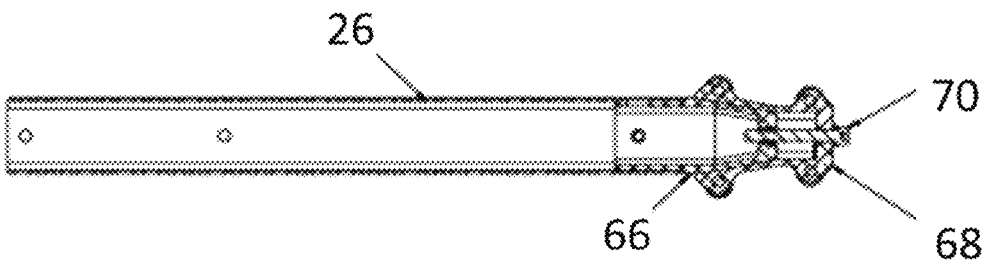
FIG. 20 is a diagram illustrating a sectional view of the arm of FIG. 19.

As shown by FIG. 20, to secure the arm 26 to the socket 68, the screw 70 is inserted through each of the holes 74, 76. That is, the screw 70 may be screwed into the socket 68 and the arm 26 such that the arm 26 is held in place relative to the socket 68 by the screw 70. In some instances, a washer 72 may be used with the screw 70, as shown in FIG. 20. In other embodiments, the arm 26 may be secured to the socket 68 by other couplers, such as one or more bolts, clips, or tabs and slots. When desired, the arm 26 may be removed from the socket 68 by first removing the screw 70 and then pulling the arm 26 from the socket 68 by hand or otherwise.

Figure 21:
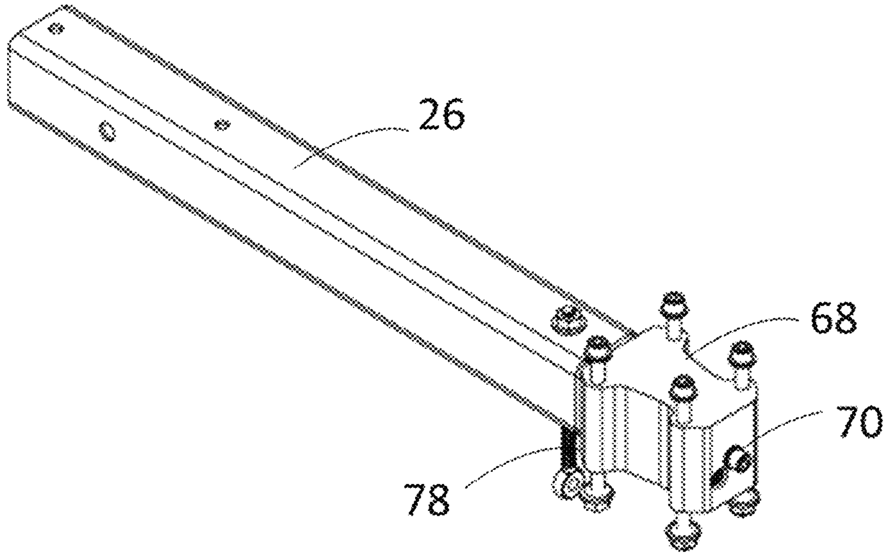
FIG. 21 is a diagram illustrating a perspective view of the arm of FIG. 19 when the arm is engaged with a socket of the drone body.
Figure 22:
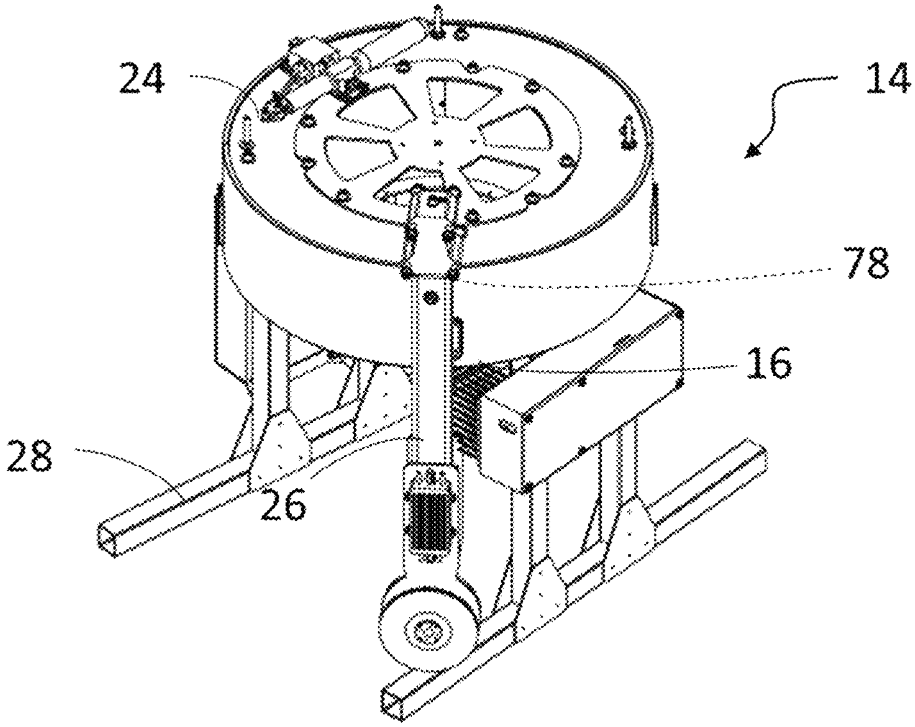
FIG. 22 is a diagram illustrating a perspective view of a tethered drone, such as is illustrated by FIG. 1, with an arm stowed for transport.

In FIG. 21, an arm 26 is shown positioned in a socket 68 with a mounting apparatus 78 extending from a side of arm 26 near the tapered end 66 (FIG. 19), although other locations of the mounting apparatus 78 on the arm 26 are possible. The mounting apparatus 78 may be connected to the drone body 24 to facilitate transport of the drone 14, such as to and from a launch point. In the embodiment shown by FIG. 22, when the apparatus 78 is connected to the drone 14, the arm extends vertically. That is, the longitudinal axis of the arm 26 is parallel to the y-direction. Such positioning of the arm 26 keeps the arm 26 substantially within the footprint defined by the drone body 24 and the landing gear 28 such that the arms 26 do not significantly increase the overall footprint of the drone 14. In the embodiment depicted by FIG. 21, the mounting apparatus 78 forms a hook or loop that hooks onto or is otherwise mated with the drone body 24. As an example, the mounting apparatus 78 may be inserted into a hole of the drone body 24 such that the arm 26 essentially hangs from the drone body 24. In other embodiments, other techniques for coupling the arm 26 to the drone body 24 are possible, such as by using clips, screws, bolts, or other types of couplers. Note that each arm 26 may be configured as shown by FIGS. 19-22 and connect to the drone body 24 in the same way as described above for the arm 26 shown by FIGS. 19-22.

Figure 23:
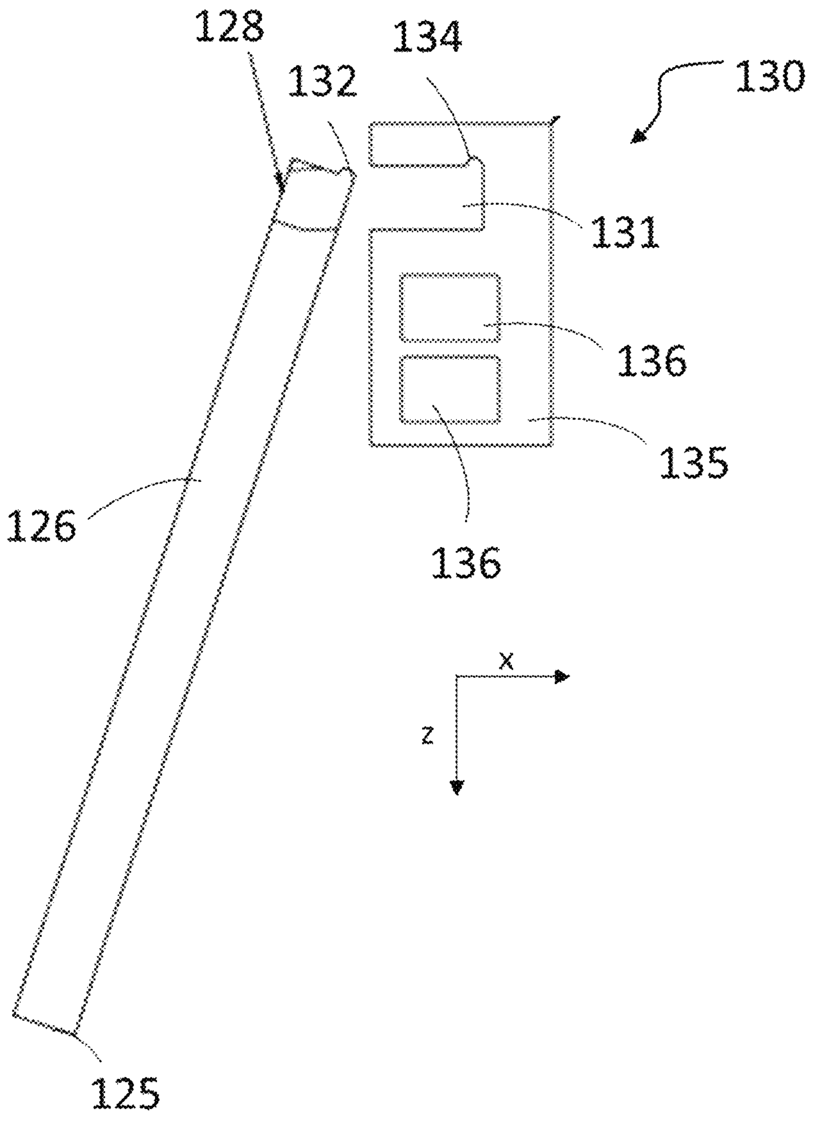
FIG. 23 is a diagram illustrating a top view of an embodiment of an arm of a tethered drone, such as is illustrated by FIG. 1, with the arm unattached to a socket of the drone body.

In another embodiment shown in FIGS. 23-28, arms 126 have different features for connection with the drone body 24. In this embodiment, each arm 126 includes a guiding plate 128 at the end to be mated with a socket 130 on the drone body 24. The socket 130 has a slot 131 for receiving the guiding plate 128 as the arm 126 is being inserted into the socket 130 by moving the arm 126 in generally the x-direction shown by FIG. 23. During insert, the arm 128 is positioned at an angle, as shown by FIG. 23, so that the guiding plate 128 slides along the walls of the slot 131, thereby guiding the arm 128 for placement in the socket 130.

Figure 25:
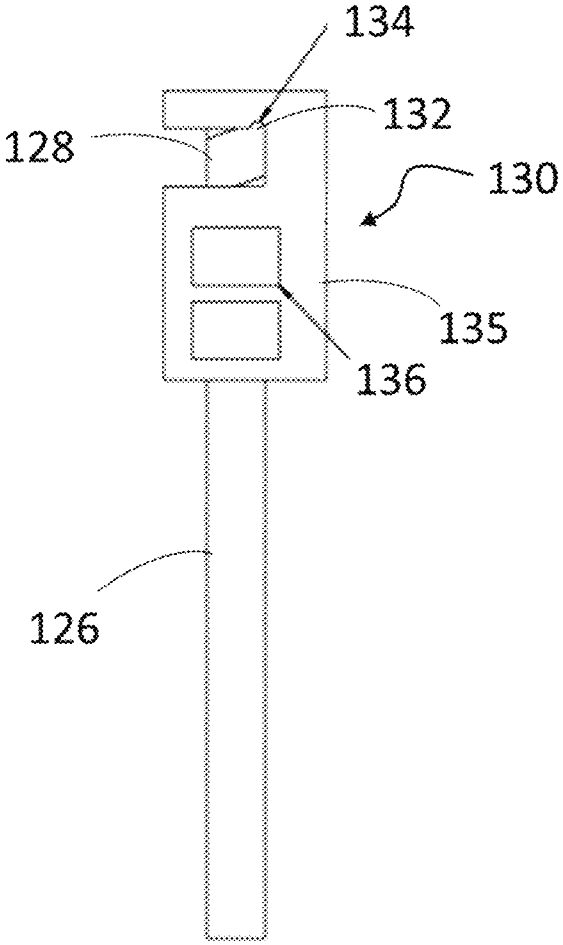
FIG. 25 is a diagram illustrating a top view of the arm depicted by FIG. 23 with the arm mated to the socket of the drone body.

As shown by FIG. 23, the guiding plate 128 has a tab 132 that is complementary to the shape of a notch 134 in slot 131. Once the tab 132 reaches the notch 134, the arm 126 may be rotated relative to the socket 130, thereby changing the angle of the arm 126 relative to the socket 130 so that the arm 136 is positioned as shown by FIG. 25. That is, the end 125 of the arm 12 away from the socket 130 may be moved in the x-direction such that the arm 126 pivots about the opposite end where the guiding plate 128 is located, thereby forcing the tab 132 into the notch 134 as shown by FIG. 25. In this position, the wall of the notch 134 is pressed against the tab 132 in response to a force that tends to move the arm 126 laterally opposite to the x-direction. That is, the wall of the notch 134 retains the arm 126 laterally.

Figure 24:
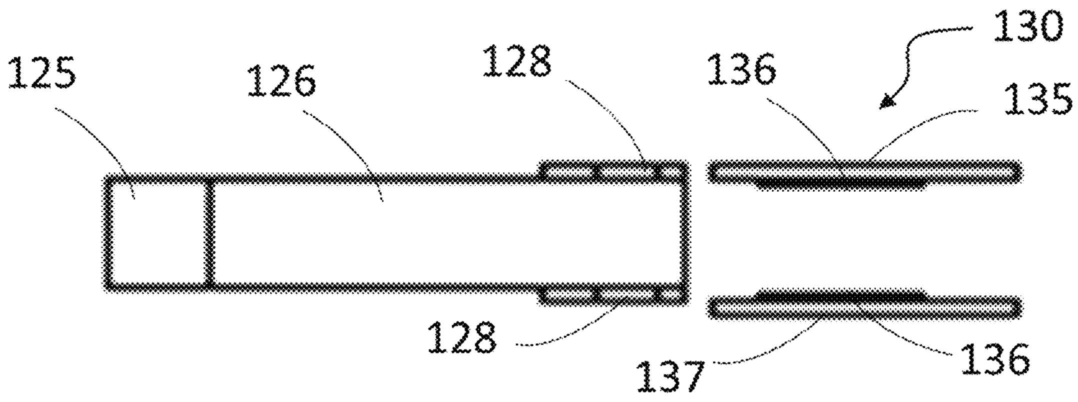
FIG. 24 is a diagram illustrating a side elevational view of the arm depicted by FIG. 23 unattached to the socket of the drone body.
Figure 26:
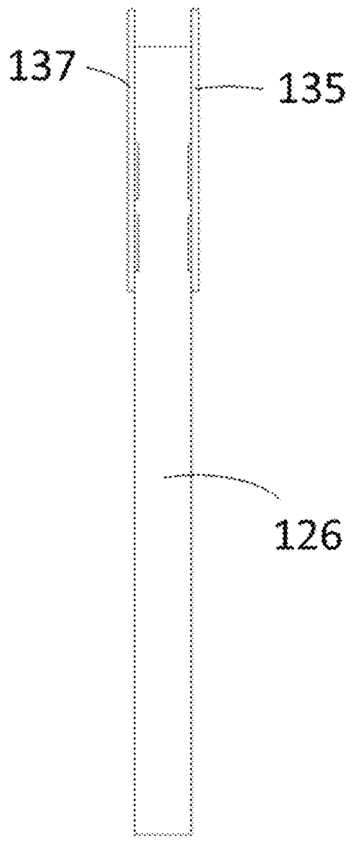
FIG. 26 is a diagram illustrating a side view of the arm and socket depicted by FIG. 25.
Figure 28:
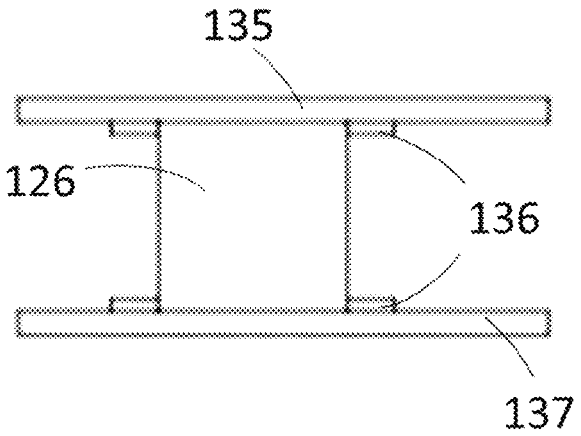
FIG. 28 is a diagram illustrating an end view of the arm and socket depicted by FIG. 27.
Figure 29:
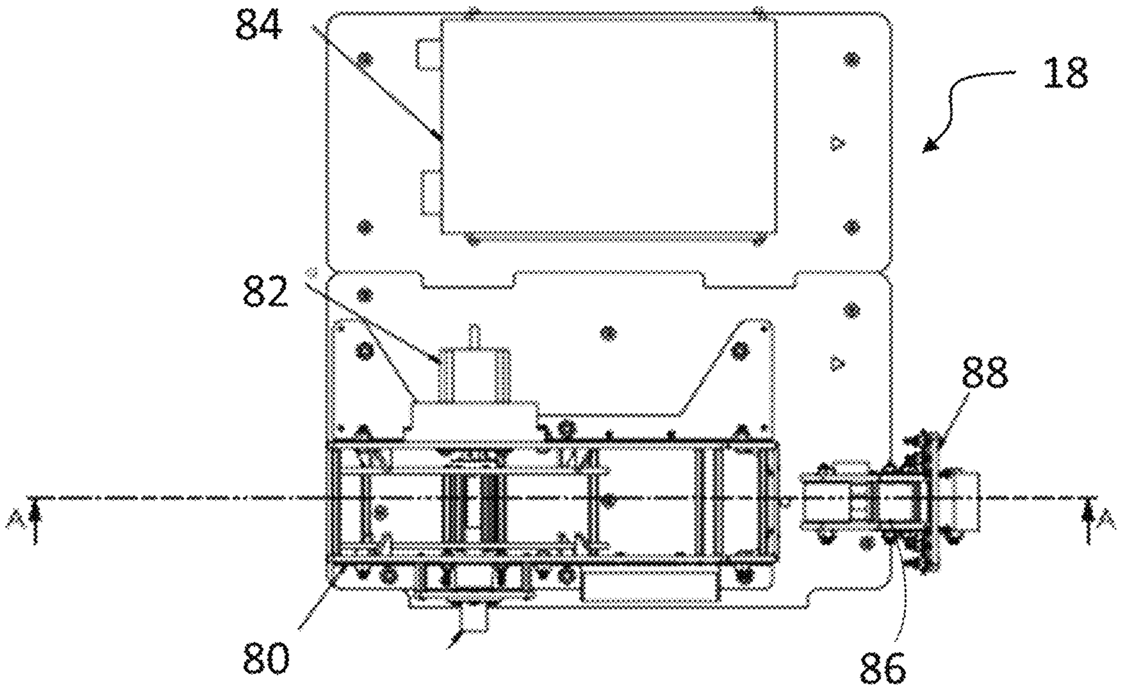
FIG. 29 is a diagram illustrating a top elevational view of a spooling system of a tethered drone system, such as is illustrated by FIG. 1.

In addition, the socket 130 has a cavity that is open on the side nearest the arm 126 in the side view in FIG. 24 such that the cavity receives the arm 126 as it is moved toward the socket 130 in the x-direction. When in this cavity, walls of the socket 130 are on opposite sides of the arm 126 and press against the arm 126 such that frictional forces resist movement of the arm longitudinally relative to the socket 130 (i.e., in the z-direction). Further, to increase these frictional forces, the socket 130 has one or more pressing devices 136 that press against the arm 126. As best shown by FIG. 26, the pressing devices 136 contact the arm 126 and may be movable such that the arm displaces the devices 136, which press against the arm 126 in response to such displacement. In some embodiments, the pressing devices 126 may be spring loaded to increase the pressure applied by the devices 126, though such a feature is unnecessary in other embodiments. In some embodiments, the pressing devices 136 are composed of a rigid material, such as a plastic. However, in other embodiments, such as is shown by FIGS. 26 and 28, the pressing devices 136 may be composed of a flexible material, such as rubber, that allows the devices 136 to deform in response to the arm 126, yet strong enough such that the deformation causes the devices 136 to apply additional pressure to the arm 126. In yet other embodiments, other types of devices for applying pressure to the arm 126 or otherwise holding the arm 126 are possible. Like the sockets 68, a plurality of the sockets 130 shown by FIG. 23 may be mounted on the drone body 24 such that an arm 126 is connected to the drone body 24 when mated with the socket 130.

Figure 27:
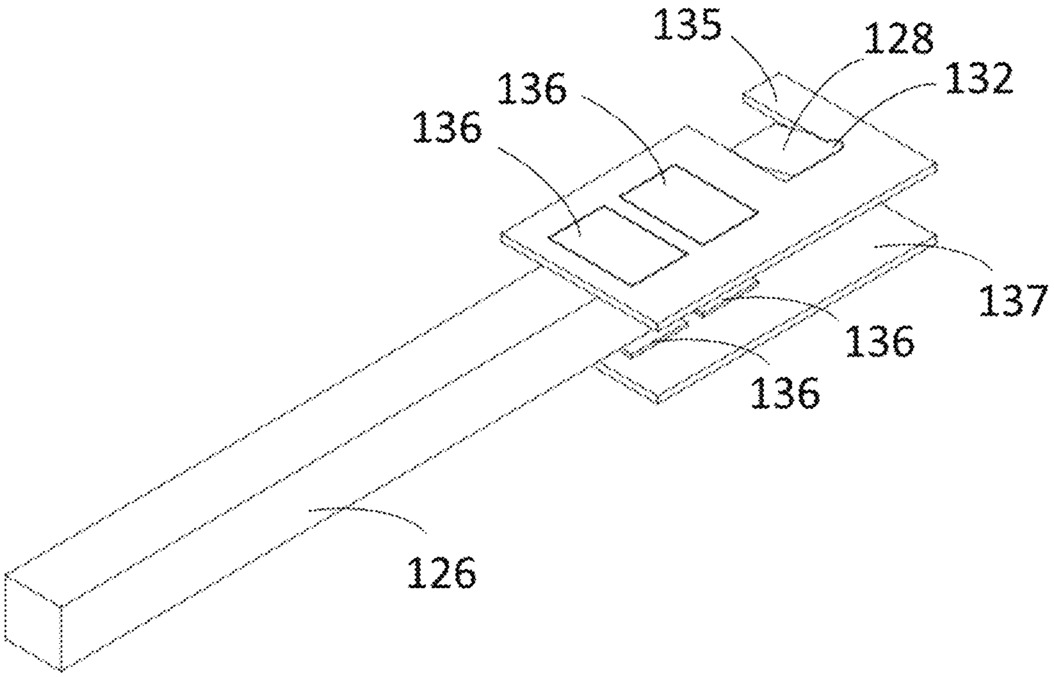
FIG. 27 is a diagram illustrating a perspective view of the arm and socket depicted by FIG. 26.

In some embodiments, as best shown by FIG. 27, the socket 130 comprises an upper plate 135 and a lower plate 137 that are individually mounted on the drone body 24. That is, the upper plate 135 is separate from the lower plate 137, but both plates 135, 137 are connected to and mechanically supported by the drone body 24. In other embodiments, the plates 135, 137 may be formed by a unitary structure that wraps partially around the arm 126. In the embodiment shown by FIG. 7, each plate 135, 137 has a pair of pressing devices 136 that contact the arm 126 when the arm 126 is inserted into the socket 130, but either plate 135, 137 may have any number of pressing devices 136 in other embodiments. Further, it is also possible for the plates 135, 137 to apply sufficient pressure to hold the arm 126 without the use of any pressing devices 136. In other embodiments, yet other configurations of the socket 130 are possible.

Figure 32:
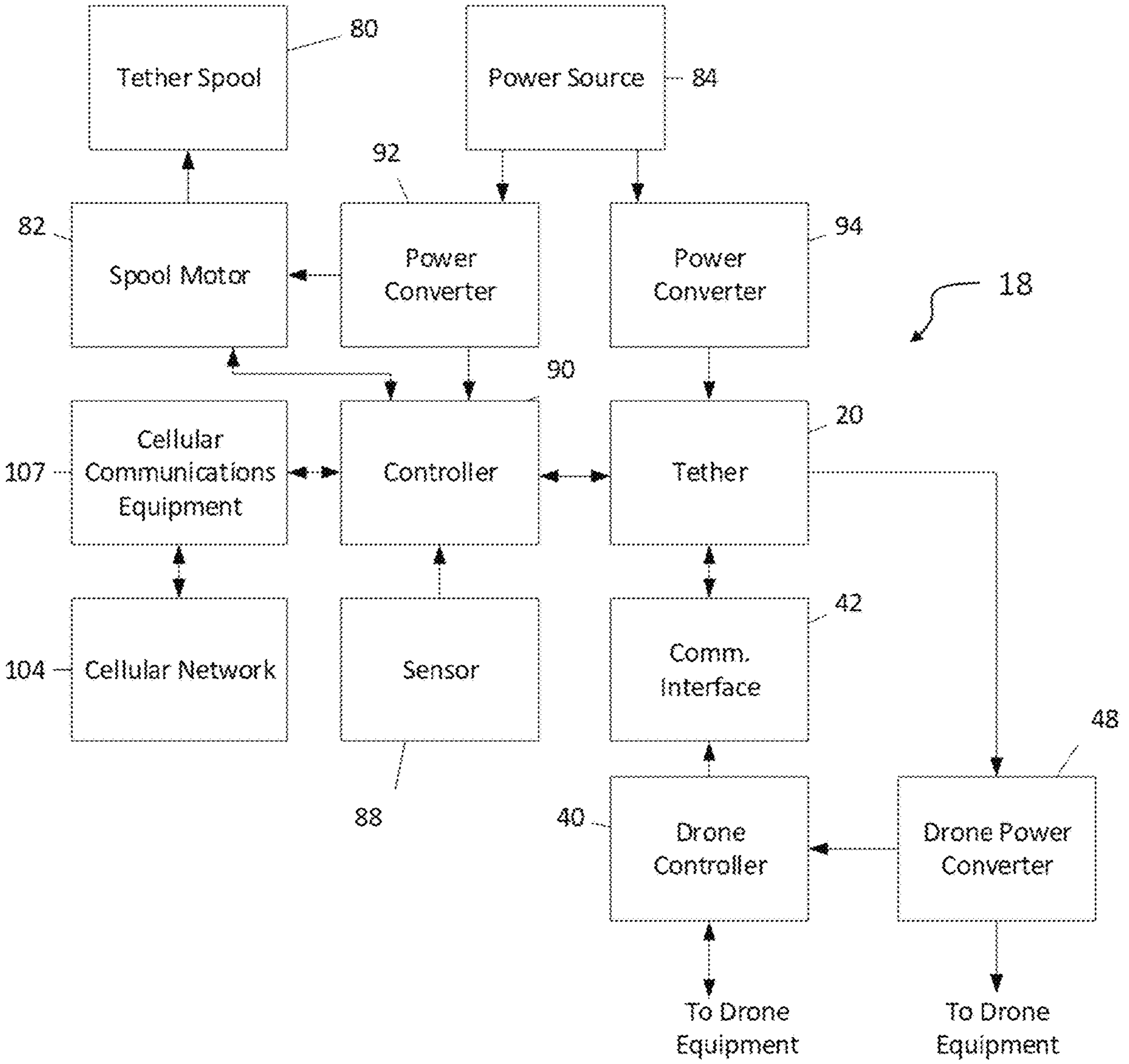
FIG. 32 is a block diagram illustrating an embodiment of a tethered drone system.

Now referring to FIG. 32, the base system 18 is displayed from a top view. The base system 18 includes a tether spool 80 for holding and dispensing the tether 20. The tether spool 80 is driven by a spool motor 82 that rotates the tether spool 80, under the direction and control of a controller 90, to increase or decrease the length of tether 20 from base system 18. In this regard, the tether 20 is wrapped around the spool 80, which is (1) rotated in one direction in order to add to the length of the tether 20 extending from the base system 18 to the drone 14 and (2) is rotated in the opposite direction in order to reduce the length of the tether 20 extending from the base system 18 to the drone 14.

A power source 84, such as one or more batteries or generators, provides power to the spool motor 82, as well as other electrical components of base system 18. Additionally, power from power source 84 is provided to the drone 14 using wires within the tether 20, as will be described in detail below. If external power is available, such as an electrical outlet providing a 240 Volt (V) alternating current (AC) signal, the power source 84 may receive and utilize the power from such an outlet.

Figure 31:
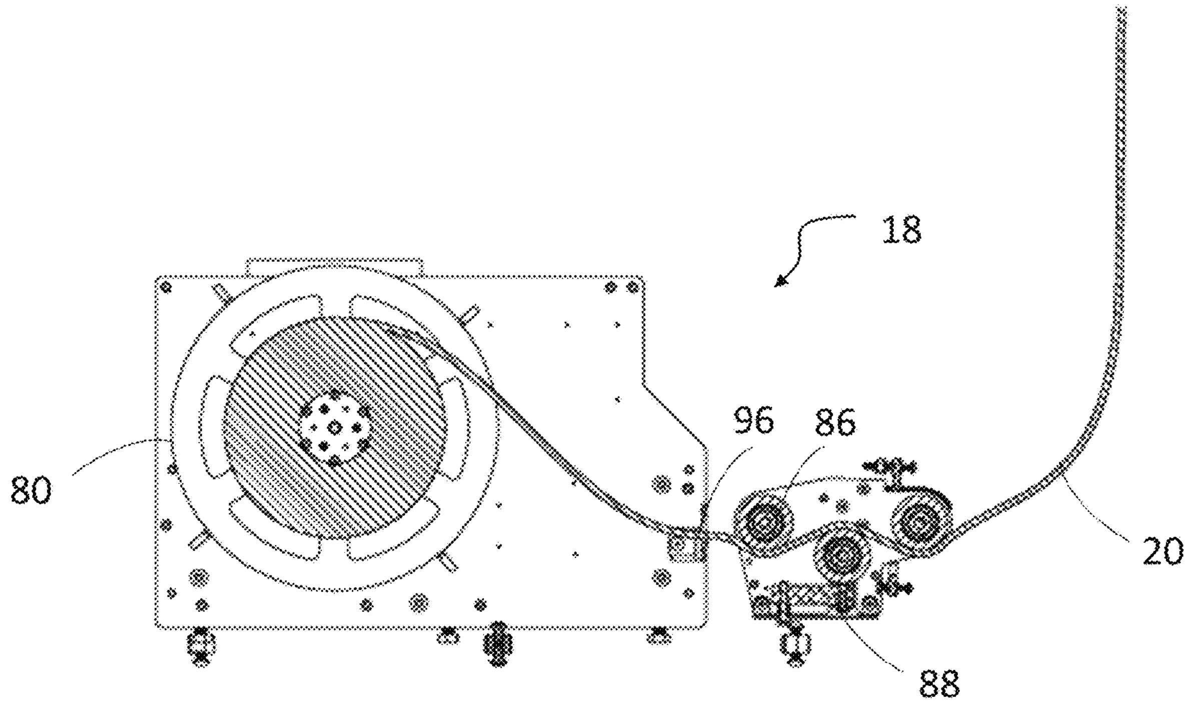
FIG. 31 is a diagram illustrating a sectional view of a spooling system as shown in FIG. 30, with the tether being spooled.

Referring to FIG. 31, a base power converter 92 is utilized to convert electrical power from the power source 94 into a form that is compatible for use by the electrical components of the base system 18, such as the spool motor 82 and the controller 90. A tether power converter 94 similarly converts the electrical power from the power source 94 to a form suitable for transmission through the tether 20 to the drone 14 for use by the drone 14. In some embodiments, the power converter 94 converts a power signal from the power source 84 to a relatively high-voltage direct current (DC) signal, such as approximately 400 Volts (V) or more. Using a high-voltage DC signal helps to reduce the current of the power signal transmitted through the tether 20 thereby permitting the tether 20 to utilize lighter gauge wires for carrying the power signal. As an example, in some embodiments, the tether may use 18 gauge wires for carrying the power signal, although other types of wires are possible in other embodiments. Using a lighter gauge wire helps to reduce the weight of the tether 20, which can be several hundred feet or more in length, such that the drone 14 is required to support less overall weight.

Figure 30:
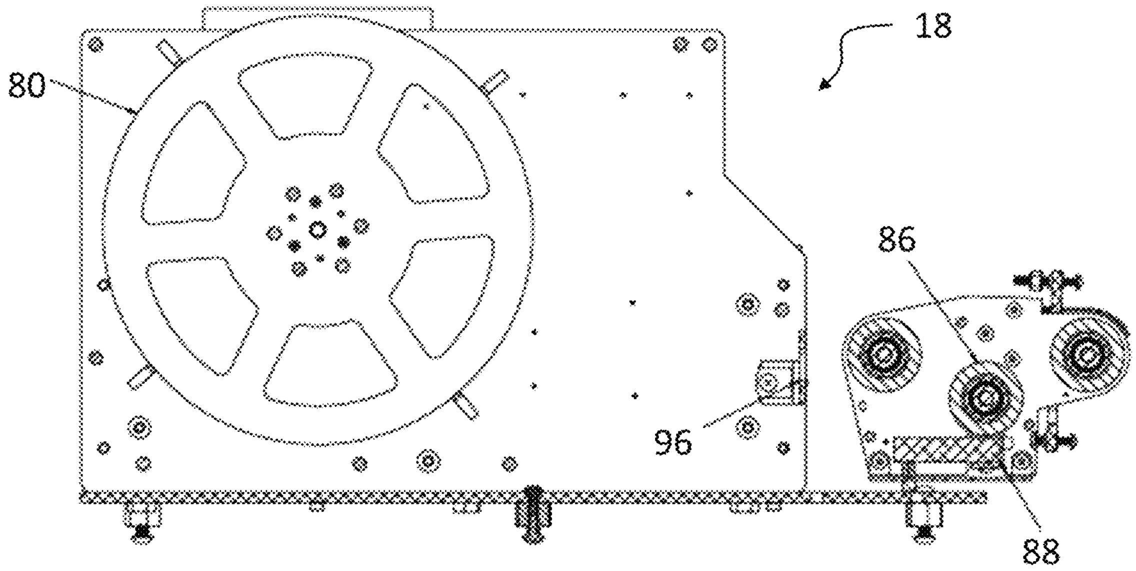
FIG. 30 is a diagram illustrating a sectional view of a spooling system along line A-A of FIG. 29.

In FIG. 30, the tether spool 80 is shown from a side view, along with other spooling components. The tether 20 is wrapped about the tether spool 80, as shown in FIG. 31, and as the tether spool 80 rotates, the tether 20 is released from or rewound about tether spool 80 depending on the direction of rotation. The tether 20 exits through a tether guide 96, which helps to keep the tether 20 at a suitable position for feeding the tether 20 through a plurality of rollers 86. As depicted, the plurality of rollers 86 includes three rollers 86 with the tether 20 entering from the tether guide 96 beneath the closest roller to tether guide 96, over the middle roller, and under the furthest roller from tether guide 86. The rollers 86 direct the tether 20 and are utilized, along with a sensor 88, to measure tension on tether 20, and such measurements may be used to control the spool motor, as will be described in more detail below.

In the embodiment depicted by FIG. 31, the sensor 88 is a strain gauge that is connected to the middle roller 86 for measuring tension. In this regard, the tether 20 applies a force to the rollers 86 depending on the amount of tension in the tether 20. The sensor 88 is configured to measure the force applied to the roller 86 by the tether 20, and this measurement is directly proportional to the amount of tension in the tether 20. In other embodiments, other types of sensors and techniques may be used to measure the tension in the tether 20.

As noted above, the tether 20 may comprise at least one pair of wires for carrying a power signal surrounded by an insulating material. Optionally included in the tether 20 is at least one optical fiber 22 for carrying data between the base system 18 and the drone 14. In other embodiments, other types of data connections are possible. As an example, a different communication medium may be included in the tether 20, or the base system 18 may communicate with the drone 14 via a wireless link, such as a Wi-Fi connection.

Referring again to FIG. 32, the high-voltage power signal transmitted through the tether 20 is received by a power converter 48 on the drone 14, and such drone power converter 48 converts the power signal into a form suitable for powering electrical components of the drone 14. As an example, the power converter 48 may convert the power signal into one or more DC power signals of a lower voltage compatible with the electrical components of the drone 14. Power may additionally be used to charge a battery 46 on the drone 14, and this battery 46 may be used as a backup source of power in the event that the drone 14 is unable to receive power from the base system 18 for any reason.

Figure 33:
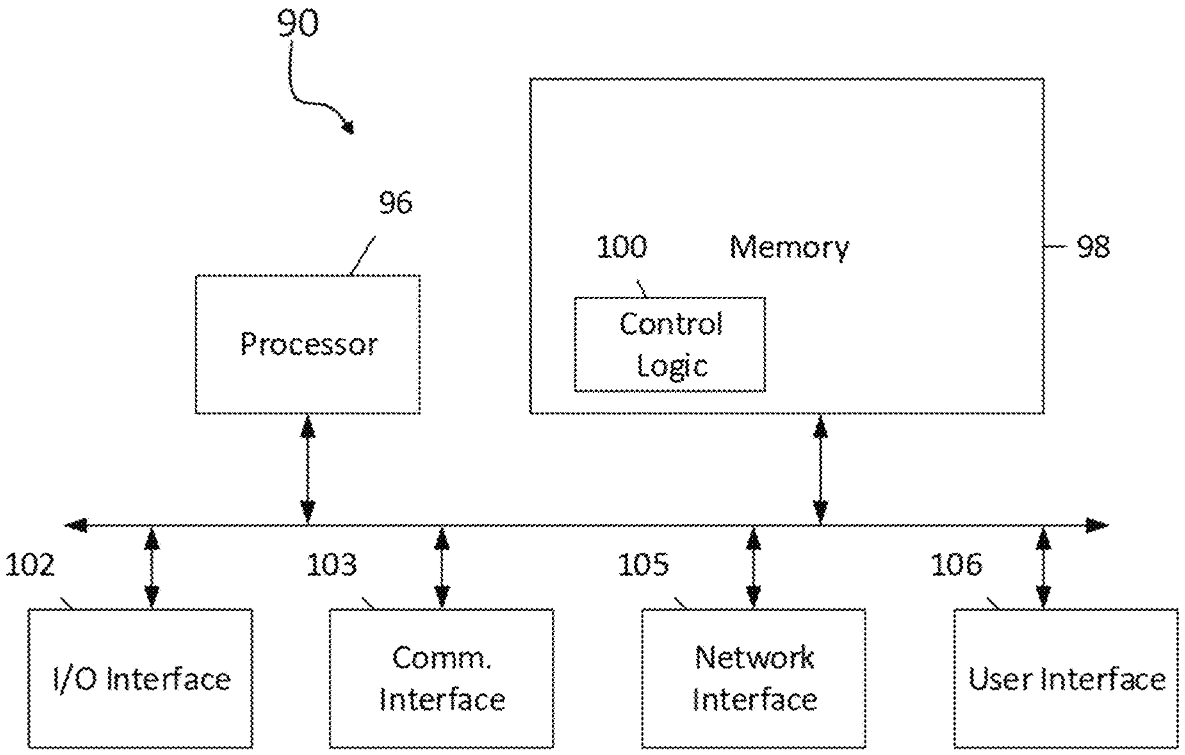
FIG. 33 is a block diagram illustrating an embodiment of a controller for a base system, such as is depicted by FIG. 29.

FIG. 33 shows an exemplary embodiment of the controller 90. The controller 90 comprises control logic 100 that controls the functionality and operation of the controller 90 as described herein. The control logic 100 may be implemented in hardware, software, firmware, or any combination thereof. In the embodiment depicted by FIG. 33, the control logic 100 is implemented in software and stored in memory 98. The controller 90 comprises at least one processor 96, such as a central processing unit (CPU) or digital signal processor (DSP), that executes software stored in memory 98, such as the control logic 100 when such logic 100 is implemented in software.

Figure 34:
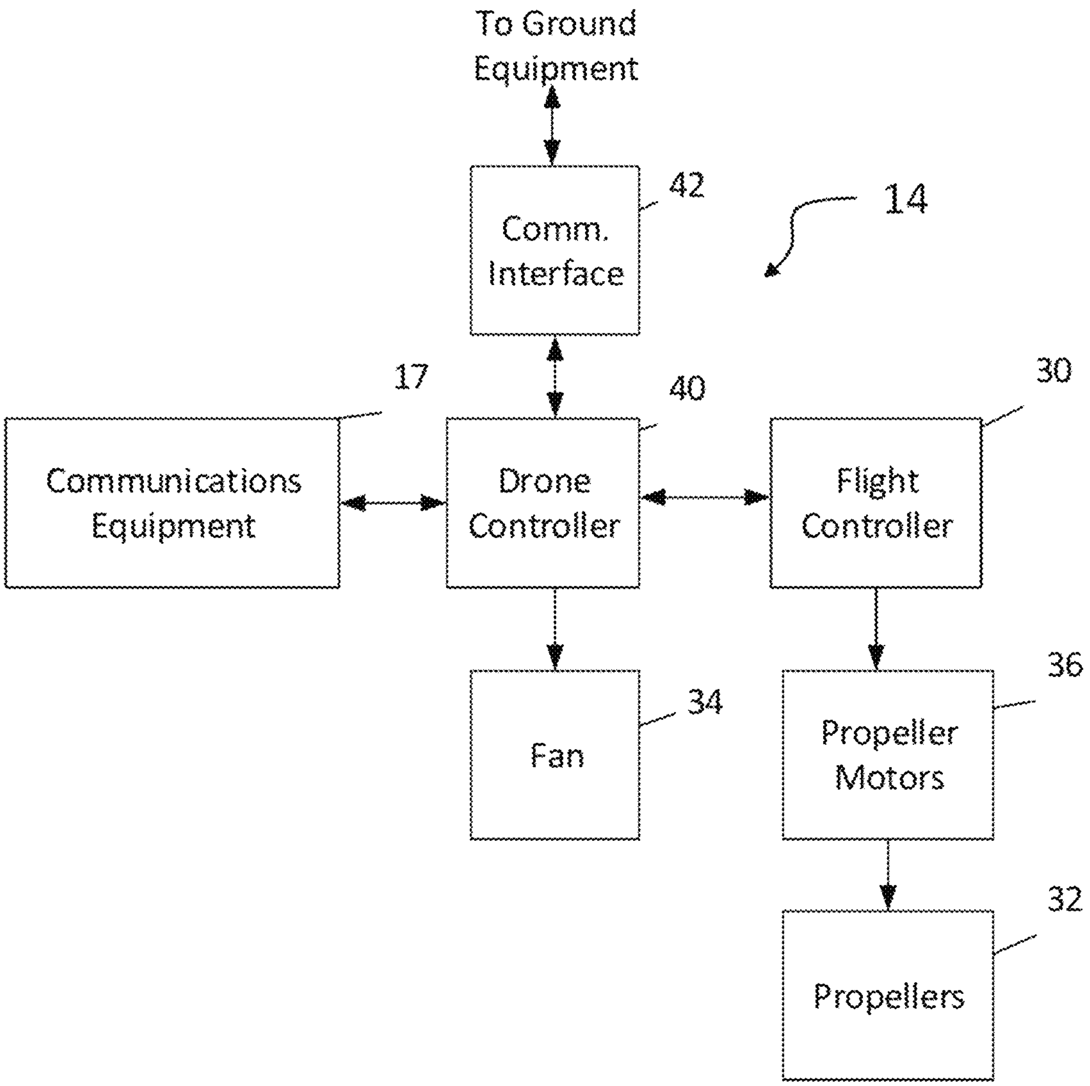
FIG. 34 is a block diagram illustrating an embodiment of a drone.

The controller 90 also has an input/output (I/O) interface, such as one or more data ports, that are connected to components, such as the spool motor 82 and the sensor 88, for enabling communication with these components. A communication interface 103 may be used by the controller 90 to communicate with the drone 14, such as the drone controller 40 (FIG. 34). As an example, if the tether 20 has an optical fiber for carrying data, the communication interface 103 may comprise an optical transceiver (not shown) that is optically coupled to the fiber for enabling communication through the fiber. If a wireless link is used for communicating with the drone 14, then the communication interface 103 may comprise an RF radio or other type of wireless communication device.

The controller 90 also comprises a user interface 106, such as a display device or other output device for outputting information to a user and a keypad, keyboard, or other type of device for receiving user input. In some embodiments, the same device such as a touchscreen may be used to both input and output data. The user interface 106 may be used by a user to provide control inputs, such as a desired location at which the drone 14 to is to fly and/or hover and when the drone 14 is to takeoff or land.

As shown by FIG. 33, the controller 90 may comprise a network interface 105 that is configured to communicate with an external network, such as the cellular network 104 depicted by FIG. 32 or other type of telecommunication network. Note that the network interface 105 may access the cellular network 104 through one or more other networks, such as a local area network (LAN) or a wide area network (WAN), such the Internet. During operation, data for cellular calls with remote mobile communication devices in wireless communication with the drone 14 may be communicated via the network interface 105.

As an example, data destined for a mobile communication device (e.g., voice data or data from the Internet or other source) may be received by the network interface 105 and transmitted to the telecommunication equipment of the drone 14 via the tether 20 (e.g., an optical fiber or other communication medium in the tether 20) or by a wireless link. The telecommunication equipment may then wirelessly transmit such data via the antenna 60 to the mobile communication device. Data from such mobile communication device may be received by the telecommunication equipment of the drone 16 via the antenna 60 or otherwise and may then be transmitted to the controller 90 via the tether 20 (e.g., an optical fiber or other communication medium in the tether 20) or by a wireless link. The controller 90 may then transmit such data via the network interface 105 to the cellular network 104 or other network as may be desired.

In some embodiments, as shown by FIG. 32, the base system 18 may include cellular communications equipment 107 for performing at least some functions of a base station such that the weight of the payload 16 on the drone 14 can be reduced. In such an embodiment, the payload 16 carried by the drone 14 may include one or more cellular transceivers (not specifically shown) and an antenna 60. When a cellular signal is received by the antenna 60 and a transceiver on the drone 14, the data from the signal may be transmitted to the controller 90, which passes the data to the cellular communications equipment 107 for processing, and the cellular communications equipment 107 may be configured to forward call data as appropriate to the cellular network 104. That is, the cellular communications equipment may be configured to implement functions of a typical cellular base station such that the combination of the cellular communications equipment 107 with the payload 16, such as one or more transceivers and an antenna 60, function as a cell site.

Notably, some or all of the cellular communications equipment 107 may be carried by the drone 14 but having more of the equipment 107 at the base system 18 helps to reduce the weight of the drone 14 and thus the thrust requirements of the propellers. Therefore, in some embodiments, the payload 16 itself may function as a cell site or the combination of the payload 16 with equipment 107 at the base system 18 may function as a cell site for providing cellular service to cellular communication devices within a vicinity of the drone 14. Note that, when the drone 14 is used to provide access to a different type of telecommunication network other than cellular, the base system 18 may include equipment similar to the cellular communications equipment 107 for interfacing the system 10 with the telecommunication network.

As noted above, the sensor 88 is configured to measure tension of the tether 20, and the controller 90 is configured to control the spool motor 82 based on measurements by the sensor 88. As an example, the sensor 88 may be a strain gauge. The controller 90 may be configured to receive measurements from the sensor 88 and automatically control the spool motor 82 such that the amount of tension remains with the predefined range. As an example, the controller 90 may store an upper threshold and a lower threshold defining a desired range for the measurements by the sensor 88. If the measured tension exceeds the upper threshold, then the controller 90 may be configured to control the spool motor 82 such that the spool 80 is rotated in a direction that allows more of the tether 20 to be unspooled, thereby increasing the overall length of the tether 20 between the base system 18 and the drone 14. Such action should have the effect of lowering the tension in the tether 20. The controller 90 may continue to control the spool motor 82 in such manner until the measured tension decreases by a predefined amount or to a predefined level or threshold.

On the other hand, if the measured tension falls below the lower threshold, then the controller 90 may be configured to control the spool motor 82 such that the spool 80 is rotated in a direction that spools more of or draws in the tether 20, thereby decreasing the overall length of the tether 20 between the base system 18 and the drone 14. Such action should have the effect of increasing the tension in the tether 20. The controller 90 may continue to control the spool motor 82 in such manner until the measured tension increases by a predefined amount or to a predefined level or threshold.

Thus, by controlling the spool motor 82 in the manner described above, the tether spool 80 can be rotated as appropriate in order to spool or unspool the tether 20 in order to keep the measured tension within a desired range.

Referring to FIG. 34, the drone 14 comprises a drone controller 40 that is configured to control the drone 14 as described herein. The drone controller 40 may be implemented in hardware or any combination of hardware, software, and firmware. As an example, the drone controller 40 may comprise one or more processors programmed with instructions for performing the tasks described herein for the controller 40.

The drone 14 also comprises a communication interface 42 that is configured to communicate with the base system 18. As an example, if the tether 20 has an optical fiber for carrying data, the communication interface 42 may comprise an optical transceiver (not shown) that is optically coupled to the fiber for enabling communication through the fiber. If a wireless link is used for communicating with the base system 18, then the communication interface 42 may comprise an RF radio or other type of wireless communication device.

Note that the data communicated between the base system 18 and the drone 14 may include the telecommunication data that is communicated with remote mobile devices by the telecommunication equipment as well as control data for controlling the drone 14. As an example, the controller 90 may transmit control information instructing the drone 14 to perform one or more actions, such as to hover or fly to a certain altitude or location or to takeoff or land. Based on this information, the drone controller 40 is configured to control the drone 14 in the desired manner.

As an example, the drone 14 may comprise a flight controller 30 that is configured to control movement or flight of the drone 14 based on instructions from the drone controller 40. As an example, the drone controller 40 may provide data indicative of a location and altitude at which the drone 14 is to hover. Based on this information, the flight controller 30 may be configured to control the propeller motors 36 as appropriate to cause the drone 14 to fly to the indicated location and altitude and to hover at this point in space.

Like the drone controller 40, the flight controller 30 may be implemented in hardware or any combination of hardware, software, and firmware. As an example, the flight controller 30 may comprise one or more processors programmed with instructions for performing the tasks described herein for the flight controller 30.

Note that the flight controller 40 may include a plurality of flight sensors for providing sensor data used by the flight controller 30 to control the drone 14. As an example, the flight sensors may comprises one or more accelerometers, gyroscopes, airspeed indicators, altimeters, and other sensors typically used by aircraft to control flight, including roll, pitch, and yaw. The flight sensors may also comprise one or more navigational sensors, such as a compass or a global positioning sensor (GPS), for use in navigating the drone 14 to a desired location. Techniques for autonomous control of drones in flight are generally well known and will not be described in detail herein.

For illustrative purposes, assume that it is desirable to implement a cellular base station at a particular location, such as a remote region that typically has insufficient cell coverage for an event or a region of a catastrophic event, such as a hurricane, that has damaged or interrupted operation of existing cell towers. The tethered drone system 10, including the drone 14 and the base system 18, may be transported to the particular location for which additional cell coverage is desired.

During transport, the drone 14 may be disassembled to reduce its overall footprint. As an example, each of the arms 26 may be removed from its respective socket 68 and hooked onto or otherwise mated with the drone body 24 as shown for a single arm 26 in FIG. 22. In some embodiments, arms 26 are detached for transport, but stored separately from drone body 24. Furthermore, landing gear 28 may be detached for transport and reassembled on drone body 24 prior to use. In some embodiments, the antenna 60 may be in the stowed position. In such a disassembled state, the drone 14 and base system 18 may be sufficiently small to fit in a suitcase for transport. Note that it, in the disassembled state, it is unnecessary for the arms 26 to be hooked onto or otherwise mated with the drone body 24. As an example, the arms 26 may be transported separately from the other components of the drone 14.

Upon arriving at or near the desired site for additional cell coverage, the drone 14 may be assembled for use as a cellular base station or at least a portion of a cellular base station. In this regard, the arms 26 may be connected to the sockets 68 as described above and shown by FIG. 2. In addition, the payload 16, which in this case may comprise telecommunication equipment for implementing a cellular base station or at least a portion of a cellular base station (e.g., one or more cellular transceivers and antenna 60), may be attached to the drone 14 in the payload bay 38. In this regard, the telecommunication equipment may be connected to a pair of mounting brackets 54 and each mounting bracket 54 may be coupled to a respective mounting rail 50 according to the techniques described above.

Once the drone 14 is appropriately assembled for flight. A user may provide inputs via the user interface 106 (FIG. 34) instructing the drone 14 to fly to and hover at a particular location and altitude. In response, the controller 90 may transmit instructions to the drone 14 for causing it to fly to and hover at the particular location and altitude. After takeoff and/or when the drone 14 arrives at the desired location or reaches at least a certain altitude, the drone controller 40 may control the antenna 60 to move it from the stowed position to the extended position, as shown by FIG. 18. While hovering and the antenna 60 is in the extended position, the telecommunication equipment may be used to communicate with a large number of mobile communication devices, such as a smartphones or other cell phones, within communication range of the equipment. Note that the drone 14 may continuously hover at or near the desired location for an extended period of time, such as several hours, days, weeks, or even longer.

Once use of the drone 14 at its current location is no longer desired, a user may provide an input via input interface 106 (FIG. 34) instructing the drone 14 to land. In response, the controller 90 may transmit a command to the drone 14 instructing it to land, and the flight controller 30 may control the propeller motors 36 such that the drone 14 lands as instructed. Prior to landing, such as prior to leaving its current hover position or when the drone 14 reaches a certain altitude, the drone controller 40 may control the antenna 60 to transition it from the extended position to the stowed position so as to reduce the likelihood of the antenna 60 being damaged during landing. Once the drone 14 has landed, it may be disassembled by removing the arms 26 from the sockets 68, and optionally by removing landing gear 28 from drone body 24. If desired, the arms 26 may be hooked onto or otherwise mated with the drone 24, as shown for a single arm 26 in FIG. 22. The disassembled drone 14 may then be transported to another location for storage or use at the other location.

Use of the system 10, as described above, enables a cellular base station to be quickly and easily implemented at a relatively low cost at nearly any desired location. With a relatively low weight and size, the system 10 can be transported by car or carried by one or more users to the desired location for takeoff.

Various configurations of a tethered drone for use in carrying telecommunication equipment are described above. It should be noted, however, that the drone described above may be used in other applications for carrying other types of equipment related or unrelated to telecommunication. As an example, the payload 16 may comprise a Wi-Fi repeater that receives and regenerates Wi-Fi signals in order to extend the communication range of such signals. In this regard, one or more links of a telecommunication network for carrying voice or data to or from subscribers may be a Wi-Fi connection, and the system 10 may be used as a Wi-Fi repeater for extending the range of such connection. Yet other types of telecommunication equipment, including other types of repeaters, may be carried by the drone 14 in other embodiments. In addition, the configurations and concepts described above can be applied to and used with other types of drones, such as untethered drones.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

The invention claimed is:

1. A tethered drone system for providing telecommunication services, comprising:

a drone coupled to telecommunication equipment for providing access to a telecommunication network for a plurality of remote communication devices in communication range of the telecommunication equipment, the drone having at least one propeller coupled to at least one propeller motor for driving the at least one propeller;

a base system coupled to the drone by a tether, the base system having a controller and a power converter, the controller configured to transmit control data to the drone for controlling an operation of the drone, the power converter configured to transmit a power signal through the tether to the drone for powering electrical components of the drone, including the at least one electrical motor; and a plurality of rollers connected to the base system, wherein the tether is configured to extend between the plurality of rollers;

wherein the plurality of rollers includes three rollers, wherein the tether is configured to extend beneath a first of the three rollers, above a second of the three rollers, and beneath a third of the three rollers;

wherein the second of the three rollers is pushed away from the first of the three rollers as a tension in the tether increases; and wherein the at least one propeller is coupled to a body of the drone, wherein the body has a hollow interior, and wherein the body is coupled to a fan positioned above the body of the drone to blow air downward through the hollow interior to the telecommunication equipment.

2. The tethered drone system of claim 1, wherein the second of the three rollers includes a strain gauge configured to measure the tension in the tether.

3. The tethered drone system of claim 1, wherein the telecommunication equipment comprises an antenna for wirelessly communicating radio frequency (RF) signals, wherein the antenna is movable between a first position and a second position, and wherein the antenna extends below the drone when in the second position.

4. The tethered drone system of claim 3, further comprising a cellular transceiver for communicating cellular signals via the at least one antenna.

5. The tethered drone system of claim 3, wherein the antenna is configured to rotate from the first position to the second position.

6. The tethered drone system of claim 1, wherein the at least one propeller includes a plurality of propellers driven by a plurality of propeller motors, and wherein a combined weight of the drone and the telecommunication equipment is less than 50% of a total thrust capacity provided by all of the propeller motors of the drone.

7. The tethered drone system of claim 1, wherein the at least one propeller includes a plurality of propellers driven by a plurality of propeller motors, and wherein a combined weight of the drone and the telecommunication equipment is less than 20% of a total thrust capacity provided by all of the propeller motors of the drone.

8. The tethered drone system of claim 1, wherein the drone comprises a socket, wherein the at least one propeller is mounted on an arm that is coupled to and removable from the socket.

9. The tethered drone system of claim 1, wherein the telecommunication equipment is coupled to a mounting rail of the drone.

10. A method for providing telecommunication services, comprising:

flying a drone at an altitude, wherein the flying comprises driving at least one propeller of the drone with at least one propeller motor to generate thrust;

communicating wireless signals between telecommunication equipment coupled to a drone and a plurality of remote communication devices in communication range of the telecommunication equipment;

providing the plurality of remote communication devices with access to a telecommunication network via the telecommunication equipment;

transmitting electrical power through a tether coupled to the drone, wherein the tether extends between a plurality of rollers;

powering electrical components of the drone with the electrical power, including the at least one propeller motor;

transmitting control data from a base system to the drone; and controlling an operation of the drone based on the control data;

wherein the plurality of rollers includes three rollers, wherein the tether is configured to extend beneath a first of the three rollers, above a second of the three rollers, and beneath a third of the three rollers;

wherein the second of the three rollers is pushed away from the first of the three rollers as a tension in the tether increases; and wherein the at least one propeller is coupled to a body of the drone, and wherein the method further comprises blowing air downward with a fan positioned above the body of the drone through a hollow interior of the body to the telecommunication equipment.

11. The method of claim 10, further comprising at least one strain gauge connected to at least one of the plurality of rollers measuring the tension in the tether.

12. The method of claim 10, wherein the telecommunication equipment comprises an antenna, and wherein the communicating comprises communicating the wireless signals between the antenna and the plurality of remote communication devices, and further comprising moving the antenna between a first position and a second position, wherein the antenna extends below the drone when in the second position.

13. The method of claim 10, wherein the moving comprises rotating the antenna from the first position to the second position.

14. The method of claim 10, wherein the at least one propeller includes a plurality of propellers and the at least one propeller motor includes a plurality of propeller motors, and wherein a combined weight of the drone and the telecommunication equipment is less than 50% of a total thrust capacity provided by all of the propeller motors of the drone.

15. The method of claim 10, wherein the at least one propeller includes a plurality of propellers and the at least one propeller motor includes a plurality of propeller motors, and wherein a combined weight of the drone and the telecommunication equipment is less than 20% of a total thrust capacity provided by all of the propeller motors of the drone.

16. The method of claim 10, wherein a mounting bracket secured to the telecommunication equipment is coupled to a mounting rail of the drone.

17. A tethered drone system for providing telecommunication services, comprising:

a drone coupled to telecommunication equipment for providing access to a telecommunication network for a plurality of remote communication devices in communication range of the telecommunication equipment, the drone having at least one propeller coupled to at least one propeller motor for driving the at least one propeller;

a base system coupled to the drone by a tether, the base system having a controller and a power converter, the controller configured to transmit control data to the drone for controlling an operation of the drone, the power converter configured to transmit a power signal through the tether to the drone for powering electrical components of the drone, including the at least one electrical motor; and three rollers connected to the base system, wherein the tether is configured to extend between the three rollers, wherein the tether is configured to extend beneath a first of the three rollers, above a second of the three rollers, and beneath a third of the three rollers, and wherein the second of the three rollers includes a strain gauge configured to measure a tension in the tether;

wherein the second of the three rollers is pushed away from the first of the three rollers as the tension in the tether increases;

wherein the second of the three rollers is pressed into and towards the strain gauge as the tension in the tether increases; and wherein the at least one propeller is coupled to a body of the drone, wherein the body has a hollow interior, and wherein the body is coupled to a fan positioned above the body of the drone to blow air downward through the hollow interior to the telecommunication equipment.

18. The tethered drone system of claim 17, wherein the telecommunication equipment is coupled to a mounting rail of the drone.

* * * * *